US012735292B2

(12) United States Patent
Ryan et al.

(10) Patent No.: US 12,735,292 B2
(45) Date of Patent: Sep. 15, 2026

(54) TRADING CARD IDENTIFICATION AND INVENTORY MANAGEMENT SYSTEMS, AND RELATED METHODS OF USE

(71) Applicant: Rymac Technical Solutions Inc., Edmonton (CA)

(72) Inventors: Aren Grant Ryan, Edmonton (CA); Jeremy Macmillan, Edmonton (CA)

(73) Assignee: RYMAC TECHNICAL SOLUTIONS INC., Edmonton (CA)

(*) Notice: Subject to any disclaimer, the term of this patent is extended or adjusted under 35 U.S.C. 154(b) by 677 days.

(21) Appl. No.: 17/957,952

(22) Filed: Sep. 30, 2022

(65) Prior Publication Data

US 2024/0109745 A1 Apr. 4, 2024

(51) Int. Cl.

| | |
|---|---|
| ***B65H 43/00*** | (2006.01) |
| ***B65H 1/02*** | (2006.01) |
| ***B65H 3/06*** | (2006.01) |
| ***B65H 3/68*** | (2006.01) |
| ***B65H 9/06*** | (2006.01) |
| ***B65H 29/60*** | (2006.01) |
| ***G06V 10/12*** | (2022.01) |
| ***G06V 10/94*** | (2022.01) |
| ***G06V 20/50*** | (2022.01) |
| *G06Q 10/087* | (2023.01) |

(52) U.S. Cl.

CPC ............... *B65H 43/00* (2013.01); *B65H 1/02* (2013.01); *B65H 3/0653* (2013.01); *B65H 3/68* (2013.01); *B65H 9/06* (2013.01); *B65H 29/60* (2013.01); *G06V 10/12* (2022.01); *G06V 10/94* (2022.01); *G06V 20/50* (2022.01); *B65H 2701/1914* (2013.01); *B65H 2801/39* (2013.01); *G06Q 10/087* (2013.01)

(58) Field of Classification Search

CPC ........ B65H 1/02; B65H 3/0653; B65H 29/60; G06V 10/94

USPC ................................ 700/218, 219, 223, 226

See application file for complete search history.

(56) References Cited

U.S. PATENT DOCUMENTS

| | | | |
|---|---|---|---|
| 4,899,392 | A | 2/1990 | Merton |
| 6,250,632 | B1 | 6/2001 | Albrecht |
| 7,769,232 | B2 | 8/2010 | Downs, III |
| 7,959,153 | B2 | 6/2011 | Franks, Jr. |
| 8,150,157 | B2 | 4/2012 | Downs, III et al. |
| 9,767,163 | B2 | 9/2017 | Kass et al. |
| 10,676,299 | B2 | 6/2020 | Lawlor et al. |
| 10,957,165 | B2 | 3/2021 | Dluzen et al. |
| 11,003,958 | B2 | 5/2021 | Dasari et al. |

(Continued)

FOREIGN PATENT DOCUMENTS

WO 2021237332 12/2021

OTHER PUBLICATIONS

Magic Sorter, screenshots of webpage, accessed Sep. 20, 2022, URL = https://www.magic-sorter.com/, 1 page.

(Continued)

*Primary Examiner* — Gene O Crawford

(74) *Attorney, Agent, or Firm* — Robert A. Nissen

(57) ABSTRACT

Trading card inventory management systems and related methods of use are described. These systems may include singulators, card translocators that pass cards from a receiver to storage, and back to the receiver, card chutes, and card guides. A card box system of storage and translocation is also described.

20 Claims, 30 Drawing Sheets

(56) References Cited

U.S. PATENT DOCUMENTS

| | | | | |
|---|---|---|---|---|
| 2004/0178373 | A1 | 9/2004 | Graber | |
| 2005/0167903 | A1* | 8/2005 | Hartl | B65H 5/12 271/2 |
| 2015/0035230 | A1 | 2/2015 | van Rossen et al. | |
| 2018/0194577 | A1* | 7/2018 | Gross | B25J 15/0616 |
| 2018/0246894 | A1 | 8/2018 | Kass | |
| 2018/0256967 | A1* | 9/2018 | Downs, III | H04N 25/76 |
| 2022/0286571 | A1* | 9/2022 | Hurst | B07C 5/3422 |

OTHER PUBLICATIONS

Roca Robotics, Roca—Robotic Card Sorter, accessed Jul. 21, 2021, URL = https://www.rocarobotics.com, 9 pages.
TCGMachines, Organize Your TCG Inventory, accessed Jul. 12, 2021, URL = https://tcgmachines.com, 12 pages.
Graeme Gordon, Card Sorting Machines—a Technology Older than the Automobile, Apr. 10, 2021, URL = https://tcgmachines.com/blog/card-sorting-machines-a-technology-older-than-the-automobile, 4 pages.
Graeme Gordon, If You Build It . . . , Jun. 4, 2021, URL = https://tcgmachines.com/blog/if-you-build-it, 2 pages.
Graeme Gordon, Launch Day, May 4, 2021, URL = https://tcgmachines.com/blog/launch-day, 4 pages.
Graeme Gordon, Missing Magic: Grieving the Gathering, Apr. 15, 2021, URL = https://tcgmachines.com/blog/missing-magic-grieving-the-gathering, 3 pages.
Graeme Gordon, Automation: Less Work, More Fun?, URL = https://tcgmachines.com/blog/automation-less-work-more-fun, 3 pages.
Graeme Gordon, Trends in Trading Card Collecting: from MLB to McDonalds, URL = https://tcgmachines.com/blog/trends-in-trading-card-collecting-from-mlb-to-mc-donalds, 4 pages.
Magic Sorter, screenshots of webpage, accessed Apr. 2, 2026, 3 pages, URL = https://www.magic-sorter.com/the-machine, available as early as 2018.
Rocarobotics, Roca Sorter Overview, Jan. 2, 2020, 3 pages, URL = https://www.youtube.com/watch?v=aPj4nhzRxxo.
Cardcastle, Card Bot, available as early as Aug. 2019, 16 pages, URL = https://cardcastle.co/cardbot#cardbot-features.
Theguymasamato, Card Scanner for a Trading Card Machine, available at least as early as 2019, 48 pages, URL = https://www.instructables.com/Card-Scanner-for-a-Trading-Card-Machine/.
Theguymasamato, Card Feeder for a Trading Card Machine, available at least as early as 2019, 16 pages, URL https://www.instructables.com/Card-Feeder-for-a-Trading-Card-Machine/.
Theguymasamato, Card Sorter for a Trading Card Machine, available at least as early as 2019, 21 pages, URL = https://www.instructables.com/Card-Sorter-for-a-Trading-Card-Machine/.
Chris Engle, Robot and camera recognition system project, Mar. 5, 2014, 3 pages, URL = https://www.youtube.com/watch?v=6cuvfZ1zJgM.
Relinscar, Magic the gathering lego card dispenser, Mar. 31, 2014, 2 pages, URL = https://www.youtube.com/watch?v=kKMpndm-Cc0.
Tanner Sigel, EWU Robotics 52 Card Sorter, Dec. 19, 2016, 3 pages, URL = https://www.youtube.com/watch?v=e4el7LMG4F8.
John Lee, Magic Card Sorter Test, Nov. 4, 2014, 1 page, URL = https://www.youtube.com/watch?v=8uKcVvOWFGU.
Smarugg, Magic The Gathering Card Scanner and Sorting Machine, Jul. 26, 2015, 2 pages, URL = https://community.element14.com/challenges-projects/element14-presents/benheck/ben-heck-exclusive/f/forum/143/magic-the-gathering-card-scanner-and-sorting-machine.
Bobox214, Vaccum gripper to move around play cards with a robotic arm, Apr. 9, 2016, 2 pages, URL = https://www.reddit.com/r/robotics/comments/4e0v37/vaccum_gripper_to_move_around_play_cards_with_a/.
Kapectas, Lego Mindstorms EV3 MtG Card Sorter, Apr. 8, 2017, 2 pages, URL = https://www.youtube.com/watch? v=cFEKD-X7KcM.
Pikido Edutainment, Pokemon Card Sorting Robot Arm, Aug. 2, 2017, 2 pages, URL = https://www.youtube.com/watch?v=0Oi4DWKNfh4.
J Parker, Baseball card sorting robot, Sep. 6, 2017, 3 pages, URL = https://www.youtube.com/watch? v=rQGwanwh9Ho.
Davide Tampellini, Automatic Magic card sorter—Mark I, Sep. 27, 2017, 3 pages, URL = https://www.youtube.com/watch?v=tzDOqCqFKd8.
Imakerobots, Collectible Card Game (CCG) sorting machine, Jan. 18, 2018, 1 page, URL = https://talk.vanhack.ca/t/collectible-card-game-ccg-sorting-machine/7347.
Michael Potera, Trading Card Scanner/Organizer, May 15, 2018, 8 pages, URL = https://www.hackster.io/mportatoes/trading-card-scanner-organizer-84399a.
Bigar, MTG Card Scanner Prototype, Apr. 18, 2018, 1 page, URL = https://www.youtube.com/watch?v=C_A111zwHI4.
Cardcastle, CardBot Scanning Demo, Oct. 15, 2018, 3 pages, URL = https://www.youtube.com/watch?V=EYHIVYKhOGA.

* cited by examiner 28
158
142
154
160
10

160
158
142
148
146
140
144
154
10
84
144C
144
146
144B
144E
144B
144C
144D

28

28
106
158
102
120
24
84

10
28
158
144
84
120
24

10

10
60F
62
60E
78
14
66
60D
13
60

72
10
74E
76
74A
70
14
98
78
66
60D
60E
13
60
84
80
74B 84
16
88
21
90

84C
144
88A
84E
96C
84F
84H
21
96A
96B
96
76
70
74D
60
84
74A
84E
84G
98
96

96A
84F 120
126
122D
84
122
13
122F
102A
102
104D
122E
122G
102E
124
13
130
128B
104A
104F
104
13
104B
132
128A
112
128
122B
84
102
100
102B
140B
84B
102F
138A
140
140A
102C
138
102A
108
110
18
102E
104F
138D
138F
138B
116
104B
118
104C
112
114A
13
104
104E
114

84
12
84B
100
102C
102
102A
102F
28
140
138A
116
104F
102B
138D
114A
114
110
104B
18
13
138F
138B
104A
104
104E
104C
112
108
118
12

120D
120A
84
120
100
102
120C
120C
28
120B
84B
110
140
102F
102C
112
102A
102E
102B
138A
18
13
104A
104F
138F
104B
138D
138B
114A
118
114
104
104E
104C
106
108

180
60D
182
66
60
60B 60C
60E
174
172
178
176
144B
144B
170
168
120
170
176
120
123A
120
125A
122A
123
125B
123B 125C
123C
122
122H

Card Input Flowchart

Load Cards Into Machine

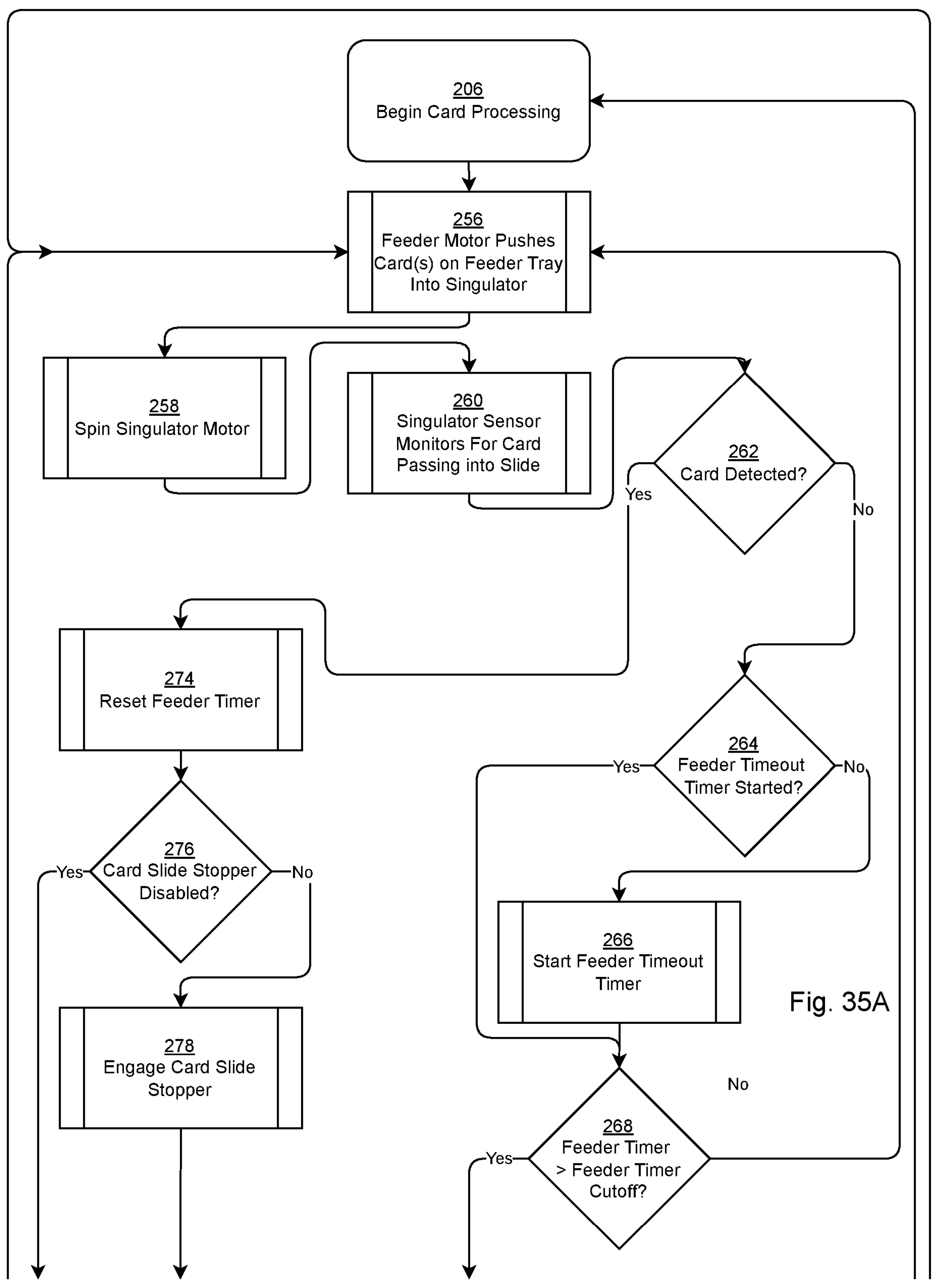
Card Processing
206
Begin Card Processing
256
Feeder Motor Pushes Card(s) on Feeder Tray Into Singulator
258
Spin Singulator Motor
260
Singulator Sensor Monitors For Card Passing into Slide
262
Card Detected?
Yes
No
274
Reset Feeder Timer
264
Feeder Timeout Timer Started?
Yes
No
276
Card Slide Stopper Disabled?
Yes
No
266
Start Feeder Timeout Timer
Fig. 35A
278
Engage Card Slide Stopper
No
268
Feeder Timer > Feeder Timer Cutoff?
Yes Card Output Flowchart Input List of Cards to Retrieve

TRADING CARD IDENTIFICATION AND INVENTORY MANAGEMENT SYSTEMS, AND RELATED METHODS OF USE

TECHNICAL FIELD

This document relates to trading card identification and inventory management systems, and related methods of use.

BACKGROUND

The following paragraphs are not an admission that anything discussed in them is prior art or part of the knowledge of persons skilled in the art.

Trading cards for games such as Magic the Gathering™ are extremely popular, valuable, and diverse in nature. Various machines exist to sort uncatalogued cards for trading card game stores, capable of outputting card lists and doing basic sorting of trading cards into predetermined stacks.

SUMMARY

A trading card identification system is disclosed comprising: a card identifier having a camera that is mounted on a structural frame and directed to capture images of a face of a trading card received in use within a card imaging area defined by the structural frame; and a computer connected to receive the images and identify one or more identity characteristics of the trading card from the images.

A method is disclosed comprising: imaging a face of an individual trading card, which is received within a card imaging area defined by a structural frame, using a camera mounted to the structural frame and directed to the card imaging area; and using a processor to analyze the images and identify the individual trading card.

A trading card inventory management system is disclosed comprising: a card receiver; a card identifier; a card discharge; a card storage; a computer; and a card translocator structured to move trading cards into and out of the card storage based on commands from the computer. For example, the translocator may move cards between: the card receiver and the card storage; and the card storage and the card discharge; based on commands from the computer.

A method is also disclosed comprising: using a processor to direct a singulator to pass trading cards one at a time from a card receiver to a card identifier; using the processor to identify trading cards at the card identifier, for example from a list of known cards; using the processor to direct a translocator to move identified trading cards into a card storage; and using the processor to direct the translocator to retrieve trading cards from the card storage.

A trading card inventory management system is also disclosed comprising: a card receiver having a card stack tray and a card singulator; a card identifier; a card discharge; a computer; in which the card singulator is structured to advance one trading card at a time from the card stack tray into the card identifier; and in which the card stack tray is structured to hold a stack of trading cards with each trading card in an upright position, on edge, with the stack of trading cards resting upon a rear shoulder of the card stack tray distal the card singulator.

A method is also disclosed comprising: directing a singulator to pass trading cards one at a time from a card receiver to a card identifier, in which the card stack tray is structured to hold a stack of trading cards with each trading card in an upright position, on edge, with the stack of trading cards resting upon a rear shoulder of the card stack tray distal the card singulator; and using the processor to identify cards at the card identifier, for example from a list of known cards. In some cases, the method includes using the processor to direct a translocator to move identified cards into a card storage.

A trading card inventory management system is also disclosed comprising: a card receiver; a card identifier; a computer; and in which the card identifier has a chute that is structured to feed trading cards, one at a time from the card receiver, to a card imaging area defined by the card identifier.

A method is also disclosed comprising: using a singulator to pass trading cards one at a time from a card receiver down a chute and to a card imaging area defined by a card identifier; using the processor to identify trading cards at the card identifier, for example from a list of known cards. In some cases, the method includes using the processor to direct a translocator to move identified cards into a card storage.

A trading card inventory management system is also disclosed comprising: a card receiver; a card identifier; a card discharge; a card storage; a computer; a card guide connected to receive trading cards from the card identifier and selectively move between: a card-receiving position where the card guide directs the trading card into a card catcher or the card storage; and a card-discharging position where the card guide directs the trading card to the card discharge.

A method is also disclosed comprising: using a singulator to pass trading cards one at a time from a card receiver to a card identifier; using the processor to identify trading cards at the card identifier; moving a card guide selectively: into a card-receiving position to receive trading cards identified from the card identifier; and into a card-discharging position to pass excluded, unidentified, or predetermined trading cards to a discharge; and using the processor to direct a translocator to move trading cards from card guide into a card storage.

A trading card inventory management system is also disclosed comprising: a card receiver; a card identifier; a card guide loaded with one or more card boxes structured to receive a plurality of trading cards from the card identifier; a card discharge; a computer.

A method is also disclosed comprising: using a singulator to pass trading cards one at a time from a card receiver to a card identifier; using the processor to identify cards at the card identifier; and passing the trading cards into one or more card boxes, each containing a plurality of trading cards.

A trading card identification system is also disclosed comprising: a structural frame defining a card receiver bay; a card identifier comprising two or more cameras mounted on the structural frame, and directed to capture images of opposed faces of a trading card received in the card receiver bay; and a computer connected to receive the images and identify the trading card.

A method is also disclosed comprising: imaging opposed faces of an individual trading card, which is received within a card receiver defined by a structural frame, using two or more cameras mounted to the structural frame; and using a processor to analyze the images and identify the individual trading card.

A trading card identification system is also disclosed comprising: a structural frame defining a card receiver bay with an open end for trading card entry access; a card identifier comprising a camera mounted on the structural frame, and directed to capture images of a face of a trading card received in the card receiver bay, in which the structural frame has a C-shaped portion with a stem separating opposed arms, with one arm mounting the camera; and a computer connected to receive the images and identify the trading card.

A method is also disclosed comprising: imaging a face of an individual trading card, which is received within a card receiver defined by a structural frame, using a camera mounted to the structural frame, in which the structural frame has a C-shaped portion with a stem separating opposed arms, with one arm mounting the camera; and using a processor to analyze the images and identify the individual trading card.

In some embodiments, methods and systems of card processing are described: Mounted Camera installation that can identify cards and scan into a point of sale (PoS) system leveraging a card database and image comparison to grade the cards post scan.

In some embodiments, methods and systems of card singulation are described: a loading tray may contain a horizontal stack of cards to be pulled into a spinning belt and pushed individually out of the tray from the front of the card stack.

In some embodiments, storage/collection systems and methods are described: card boxes may be identified and filled with cards which are indexed within their respective containers. These card boxes are then filed into larger boxes that can house multiple rows of said card boxes, in which they are indexed and then can be moved by a rotated gantry system that can retrieve and replace the larger storage boxes.

In some embodiments, card output systems and methods are described: a camera identifies a match and rotates a motor to rotate a moving part of the slide for a card to fall into either a storage collection system or an output tray for retrieval by an individual.

In some embodiments, card retrieval systems and methods are described: a gantry may retrieve cards boxes from storage box onto a tray located parallel to initial card loading platform. This tray may rotate the card boxes from a vertical position into a horizontal position and allow for the cards to then be pushed out of their card box back onto the initial card loading platform for re-singulation and processing.

In various embodiments, there may be included any one or more of the following features: A card discharge. A card storage. A chute. A card receiver. A card translocator structured to move trading cards between the card guide and the card storage based on commands from the computer. The card translocator is structured to move card boxes between the card guide and the card storage based on commands from the computer. The card imaging area is within a card insertion bay that opens to an exterior of the trading card identification system. A mouth of the card insertion bay is sized to receive into the card imaging area a part of a human hand and a trading card held by the human hand. The computer is structured to analyze images of the trading card and distinguish between trading card identity characteristics and human and non-trading card identity characteristics. The computer comprises: a local computer adjacent to the card identifier and connected to receive the images; and a remote computer connected to the local computer via the internet to receive images or identity characteristics from the local computer. There are a plurality of pairs of card identifiers and local computers, at different geographical locations, and the remote computer is connected to each of the local computers via the internet to receive and store images or identity characteristics from the local computers. Using the processor to direct a translocator to move the one or more card boxes into a card storage. A card receiver that has a card stack tray and a card singulator, which is structured to advance one trading card at a time from the card stack tray into the card identifier. The card receiver comprises a card stack tray and a card singulator, which is structured to advance one trading card at a time from the card stack tray into the card identifier. The card stack tray is structured to hold a stack of trading cards with each trading card in an upright position, on edge, with the stack of trading cards resting upon a rear shoulder of the card stack tray distal the card singulator. The card stack tray is structured to translate the stack of trading cards relative to and into contact with the card singulator along a card advancement axis defined by the card stack tray, for example to advance the stack of trading cards into contact with the card singulator. Each trading card has side edges that are relatively longer than its top and bottom edges. The card stack tray is structured to hold the stack of trading cards with each trading card resting on one of its side edges. The card receiver is structured to skew the stack of trading cards relative to the card advancement axis defined by the card stack tray. The card singulator comprises: a vertical roller disposed in an advancement path of trading cards in the card stack tray; and a lateral guide wall spaced adjacent the vertical roller to define a card slot; and the card receiver is structured to orient the stack of trading cards within the card stack tray to direct, for one trading card at a time: a leading face of the trading card against the card singulator; and a leading edge of the trading card toward the card slot. The card identifier has a chute that is structured to feed trading cards, one at a time from a card receiver, to a card imaging area defined by the card identifier. The chute is structured to define a card path that twists the trading card along the card path: from an upright position at a card input end of the chute; to a face-up position at the card imaging area. The chute is structured such that along the card path the trading card moves: from the upright position, with a leading top or bottom edge of the trading card entering the card input end of the chute first; and to the face-up position at the card staging area, with the leading top or bottom edge of the trading card entering the card imaging area first. The card identifier comprises a card stopper oriented to selectively block and unblock the card path adjacent the card imaging area, for example to retain and release a trading card within and from card imaging area during use. The card identifier comprises one or more cameras directed to capture images of a face of a trading card received in the card imaging area; and the computer is connected to receive the images and identify the trading card from a database of known trading cards. The camera comprises plural cameras oriented to capture images of front and rear faces of the trading card received in the card imaging area in use. The one or more cameras comprise plural cameras oriented to capture images of front and rear faces of the trading card received in the card imaging area in use. The plural cameras comprise: a first camera directed down toward the card imaging area; and a second camera directed up toward the card imaging area through a transparent surface of the chute. The card imaging area is sloped downward. The chute is structured to feed trading cards to a card guide that is connected to selectively move between: a card-receiving position where the card guide directs the trading card into a card catcher or a card storage; and a card-discharging position where the card guide directs the trading card to the card discharge. The card guide forms a chute that directs the trading card by gravity to the card discharge when in the card-discharging position. The card catcher is structured to hold a card stack box, whose open end is oriented to receive trading cards from the chute when the card guide is in the card-receiving position. A card stack box supply that is structured to: retain a plurality of empty card stack boxes; and supply the card stack boxes one at a time into the card catcher. The card stack box supply comprises a card stack box input chute structured to receive the card stack boxes in a stack from the card translocator. The card catcher is structured to move into and out of a card-pickup position. The card translocator is structured to collect and relocate, on commands from the computer, the card stack box located within the card catcher, to the card storage, when the card catcher is moved into a card-pickup position. The computer is structured to: send control signals to direct the card translocator to move into the card storage the trading cards, or card boxes containing trading cards, identified using data from the card identifier; and assign and store card storage location information for each trading card located within the card storage. The computer is connected to send control signals to direct the card guide to: move into the card-receiving position based on commands from the computer to store the trading card; and move into the card-discharging position based on commands from the computer to discharge the trading card. The card translocator comprises a crane. The crane comprises a multi-axis gantry. The crane comprises a claw that is structured to grip a trading card or a card stack box containing a plurality of trading cards. The computer is structured to send control signals to direct the card translocator to move trading cards from the card storage to the card identifier (for example to the card receiver). The card storage is structured to store trading cards in a plurality of card stack boxes; and the card translocator is structured to, upon command of the computer, locate and dispense the trading card or trading cards stored within a selected card stack box from the card storage into the card receiver. The card storage is structured to: store plural trading cards in card boxes within the card storage; and define plural card stack box bays that are each assigned card stack box locations by the computer. The computer is structured to: analyze images of trading cards received from card identifier; identify individual trading cards by comparing the images with information in a known trading card database; identify and store in a card storage inventory database one or more identity characteristics of individual trading cards identified at the card identifier. The computer is structured to identify and store in a card storage inventory database the images or one or more identity characteristics of trading cards identified by the computer using images of the trading cards from the card identifier. The identity and identity characteristics of individual trading cards are outputted to a display. The computer is structured to output to the display or a data storage device a list of the one or more identity characteristics of trading cards processed or stored in the trading card identification system. A method comprising using the trading card inventory management system to identify trading cards. A method comprising using the trading card inventory management system to store trading cards in a card storage of the system. The structural frame has a C-shaped portion with a stem separating opposed arms, with each arm mounting a respective one of the two or more cameras. The computer is structured to analyze images of an individual trading card imaged by the card identifier, by distinguishing in the images between trading card identity characteristics and human and non-trading card identity characteristics. The computer is structured to identify the individual trading card. The computer is structured to identify and store in a card storage inventory database one or more identity characteristics of individual trading cards identified at the card identifier.

The foregoing summary is not intended to summarize each potential embodiment or every aspect of the subject matter of the present disclosure. These and other aspects of the device and method are set out in the claims.

BRIEF DESCRIPTION OF THE FIGURES

Embodiments will now be described with reference to the figures, in which like reference characters denote like elements, by way of example, and in which:

FIGS. 35A-D collectively form a flowchart for an example method of using a trading card inventory management system to process trading cards.

DETAILED DESCRIPTION

Figure 1:
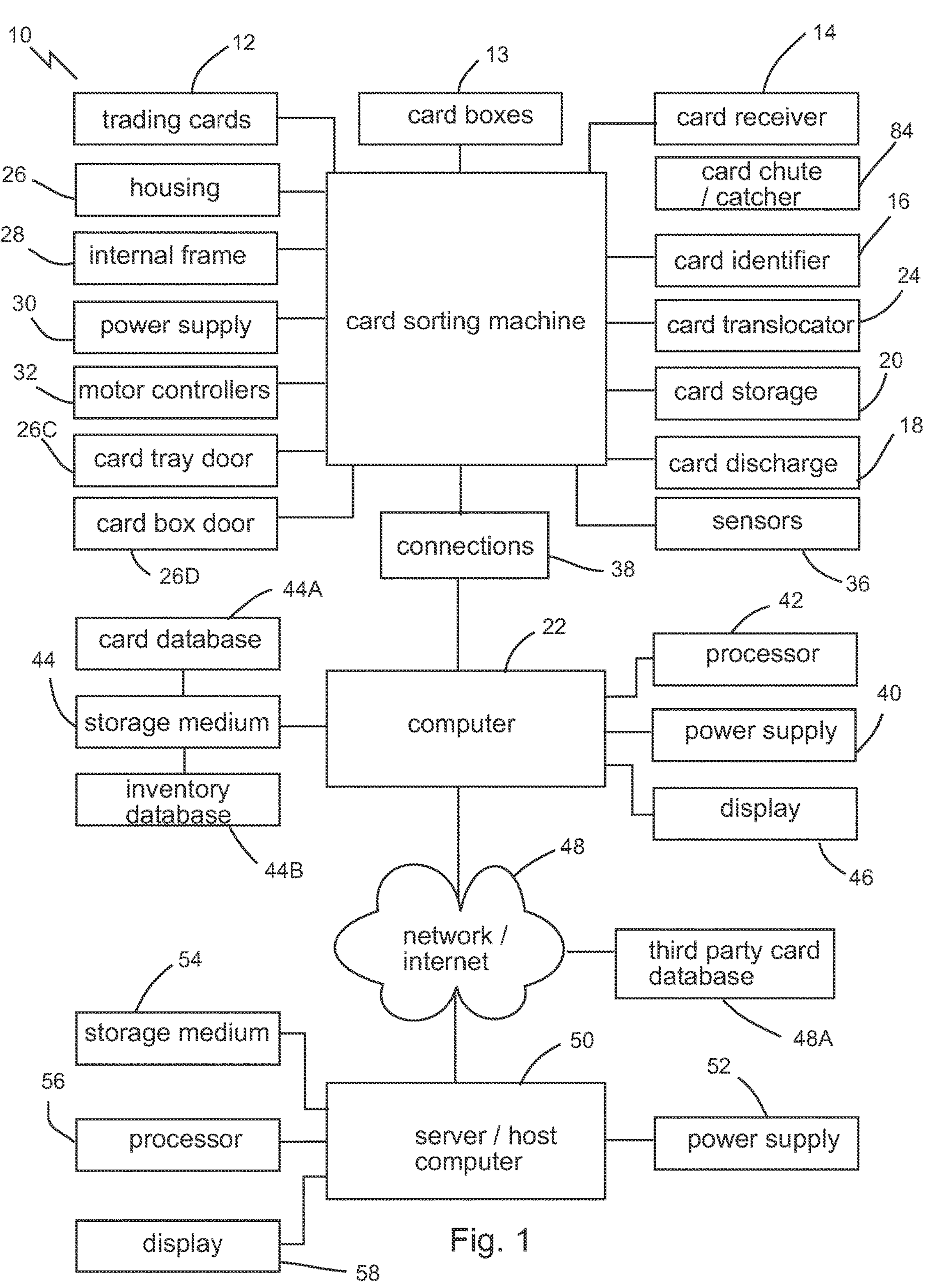
FIG. 1 is a schematic view of a trading card inventory management system.

Immaterial modifications may be made to the embodiments described here without departing from what is covered by the claims.

Collecting and trading cards is a popular hobby. Examples of different types of trading cards include, but are not limited to, Pokemon™ trading cards, Magic: The Gathering™ trading cards, and trading cards for sports teams, such as National Hockey League™ or Major League Baseball™ trading cards. A market for trading cards exists, whereby collectors may sell or trade their trading cards with others. The value of a particular trading card is based on the characteristics of that trading card. For an example, the literary and graphical content of the trading card, and its rarity compared to other cards, will impact the card's value.

Additionally, the condition of a trading card is an important factor of the card's value. For example, two copies of the exact same trading card may have different valuations based on the condition of each card. For example, if one card is in mint or near-mint condition, meaning that the card has not experienced any wear or damage, the mint or near-mint card will be more valuable than a card that is in a played or damaged condition, meaning that the card has experienced wear and tear damage or other damage over time. Another trading card characteristic that impacts the card's value is whether the card is a foil card. Certain cards may include a special foil layer, which imparts a holographic look to the card under lighting conditions. Foil cards are rarer, and typically assessed at a higher value, than non-foil cards.

Trading card dealers may receive large volumes of used trading cards, which need to be sorted, categorized and valuated so that they can be sold in the trading card marketplace. Manually sorting the trading cards, for example, to separate the foil cards from the non-foil cards, can be a tedious and time-consuming process. Furthermore, manually evaluating the condition of a plurality of trading cards so as to assign a value to the card can also be a time-consuming process. A further issue with the manual grading of a trading card's condition is that the process involves subjectivity, depending on a number of factors including the particular individual who is grading the condition of the card, the lighting conditions under which the assessment is made, and the necessity of exercising individual skill and judgment in applying the criteria for grading a card's condition. The assessment of a card's condition typically involves noting any damage to the card, caused either by accident or normal wear and tear, including but not limited to bends, tears or folds in the card, scuff marks or scratches on the card's surface, fading due to exposure to sunlight, and attempts to alter or fix the card so as to improve its appearance. An element of subjectivity is also introduced by the fact that the condition between trading cards can be quite variable, and it is difficult for an individual to consistently apply the same criteria to each and every trading card when deciding on which condition grading should be assigned to a particular card. As such, there is a need for a more objective method of assessing and grading the condition of a trading card.

Collectible and trading cards have evolved beyond a popular hobby. These cards, typically made of a special blend of paper or cardboard, contain printed images and information related to the game or universe the cards are created to represent. The first and secondhand market for such cards has grown into a full-time job for thousands of businesses and millions of individuals. The cards are bought, sold, and exchanged, while also used within a multitude of games based around the images and information contained by each card.

Magic the Gathering™ (MTG) is a tradable and collectible card game (see for example U.S. Pat. No. RE37957) that has become its own unique economy due to their manufactured conditions. MTG cards are released in boxes of booster packs, with each booster pack containing a set of randomized cards limited by the type and "block" of cards denoted for the booster box type. This booster box & pack design has allowed the creators of Magic to print a variety of different qualities of cards, such as cards with foil layers on top, along with specifying different rarities, preventing the guarantee of any specific card being directly acquired by any individual.

For a person to acquire a newly created card outside of the secondary market, they need to open a booster pack in hopes of it containing the desired item.

Instead of a card's value being strictly tied to the likelihood of the card appearing in a booster pack, the true value of a specific card fluctuates due to its availability, gameplay functionality, print type (additional foiling, alternative art, etc.), and its condition, resulting in an ever-changing financial ecosystem with purchasers becoming participants like that of the stock market. These participants will speculate on the value of any given card by evaluating the aforementioned factors, and concluding a point where buying, selling, or trading individual cards (singles) is viable. Due to the game's constant evolution of new mechanics, card variations, and interactions between newly designed cards and older ones, the final value of any given card shifts outside of a person's ability to monopolize the market.

Transactions for the secondhand market of trading and collectible cards are categorized into three types: buy, sale, and trade—all of which can be handled directly in-person, in-store at businesses (dubbed a local game store or LGS), or from other individuals and/or stores online. When an individual desires to buy a card, they will create a buy-list: a list containing card(s), quantities, and other specifications of the desired singles. When selling, an individual creates a sell-list: a similarly structured list to that of a buy-list but instead containing cards they want to sell off and the value they aim to sell for—commonly a high percentage (75%+) of the sale value from a store or larger vendor if intended to be turned into cash. Trading consists not only of finding desired card(s) on a buy-list, but also having desired card(s) on a sell-list that the owner of the buy-list is willing to exchange towards.

Stores acquire and manage multiple different types of trading cards, and have large differences between quantities and values, resulting in an assortment of storage locations and housings to best display and access product. As stores will cater to a variety of different clientele, those handling the movement of cards to and from various storage locations will create a case-by-case scenario in which stores will house their collection(s). One such example is having a display case where they store highly desired trading cards, while non-desirable cards are stored away alphabetically in storage boxes in a separate inventory area. Another example could be that of a storage system related to the printed sets of trading cards, with them organized by their collector number, value, or other defining features.

As of writing this document, known card management machines exist for trading card management such as the Roca™ by TCG Player™ and the PhyzBatch9000™ by TCG Machines™, both with their primary function as a sorting system that can scan and import cards into a digital inventory in the process. Given the variety of storage methods of cards by stores as described above, the sorting output of machines is customizable to accommodate an individual business's needs. The sorting itself is accomplished by using a series of bins that a machine can then deposit and retrieve from so that the order of a card within a pile can be manipulated into the desired order.

The Roca™ by TCG Player™ achieves its sorting capabilities by using a crane system with a suction cup vacuum and camera on the crane claw that can move throughout an xyz coordinate system overtop a series of 66 indexed bins sized specifically for trading cards. The machine has a row consisting of 8 assigned input bins where a user may store piles of unorganized/documented cards and one initial sorting bin, which after user input, will begin the crane's operation of moving the suction cup and camera combination over the bins and identifying cards picking them up with the suction system. The machine will spread out the identified cards in separate piles over many intermediary storage bins until it has made a complete index of all cards containing their new bin location and order within their new piles. From this step, the machine will then compute an ordered list according to the earlier user input, as well as a path of movement operations required to manipulate the cards into the specified order as a series of final piles. Once determined, the machine will begin the process re-translocating the cards to output bins as their final resting place by leveraging intermediary bins in order to re-assign the card location in piles. While the cards are placed into their final destination in the specified order, the user is able to view the resultant list of scanned cards, their order, and various other details regarding the cards printed information. Finally, upon completion of sorting, the Roca™ allows for the user to retrieve their now organized selection of cards for storage input the completed list into the stores specific inventory.

The Phyzbatch 9000™ by TCG Machines™ uses a gravity fed column and conveyer belt system to accomplish a nearly identical output as to that of the Roca™ by TCG Player™ using a card identification technique followed by bins to deposit the cards. Cards are loaded into a tall card-shaped column, with a singulation wheel at the bottom, a small slot that fits one card at a time, and a conveyer belt that accepts the singulated cards. A user specifies the preferred order method for the provided stack of cards, which the computer will then reference for movement of a card to its final resting place within the machine. The singulated cards are then moved underneath a camera which identifies the card.

Bin output for sorting requires manual stacking of input cards in specific order from bins but they are then organized in the pattern specified by stores (alphabetical, set, card #, etc.). The solutions articulated herein may allow for machine re-iteration through stack(s) of cards for precise control of machine so that it may re-sort itself to whatever optimal method is desired, though in ideal world organization of cards is irrelevant if a computer has digitally indexed locations and can fetch without need of human intervention.

Figure 2:
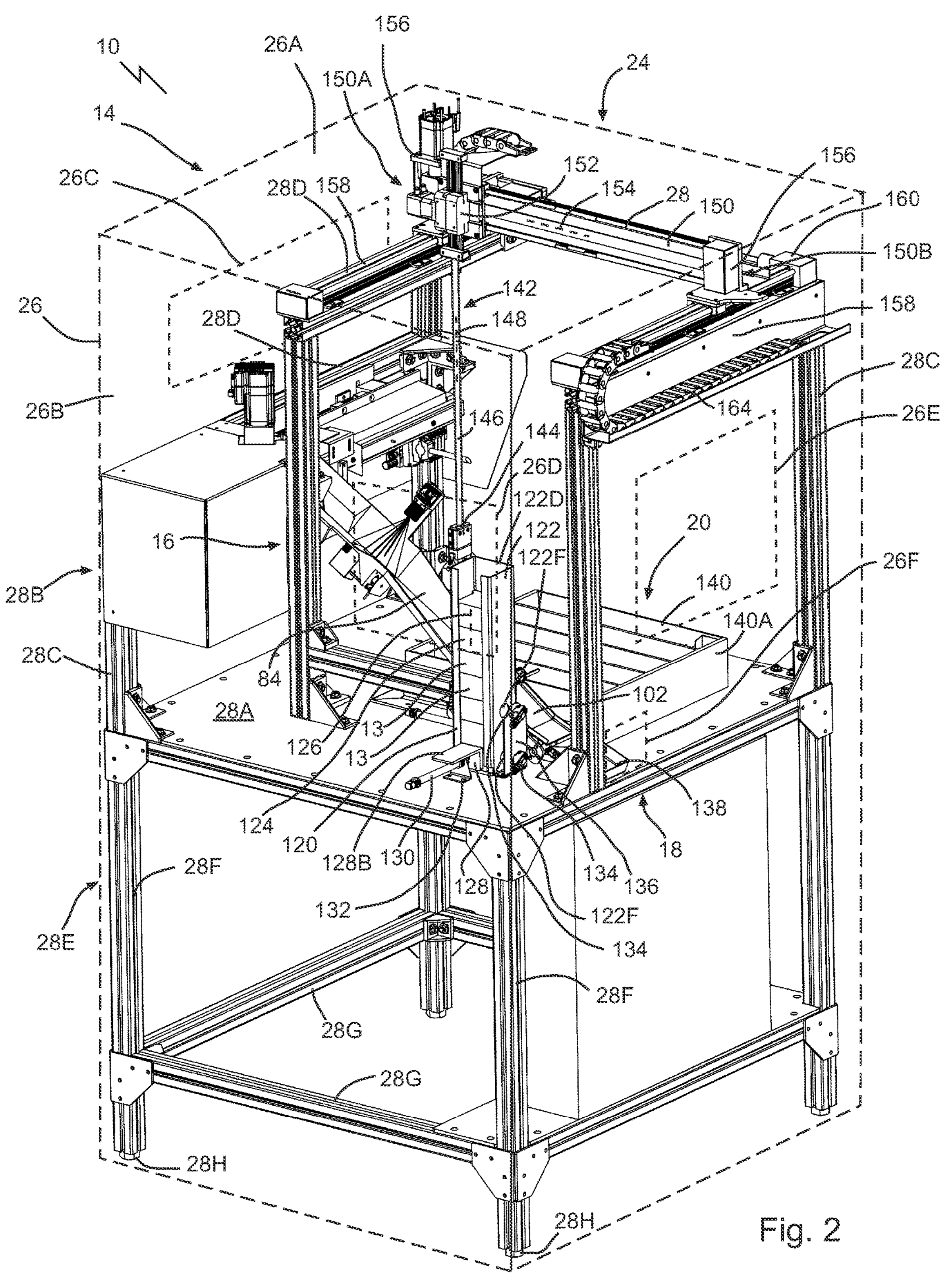
FIG. 2 is a front perspective view of an example trading card inventory management system, with the silhouette of an outer housing and associated parts illustrated in dashed lines to highlight the internal components of the system.
Figure 3:
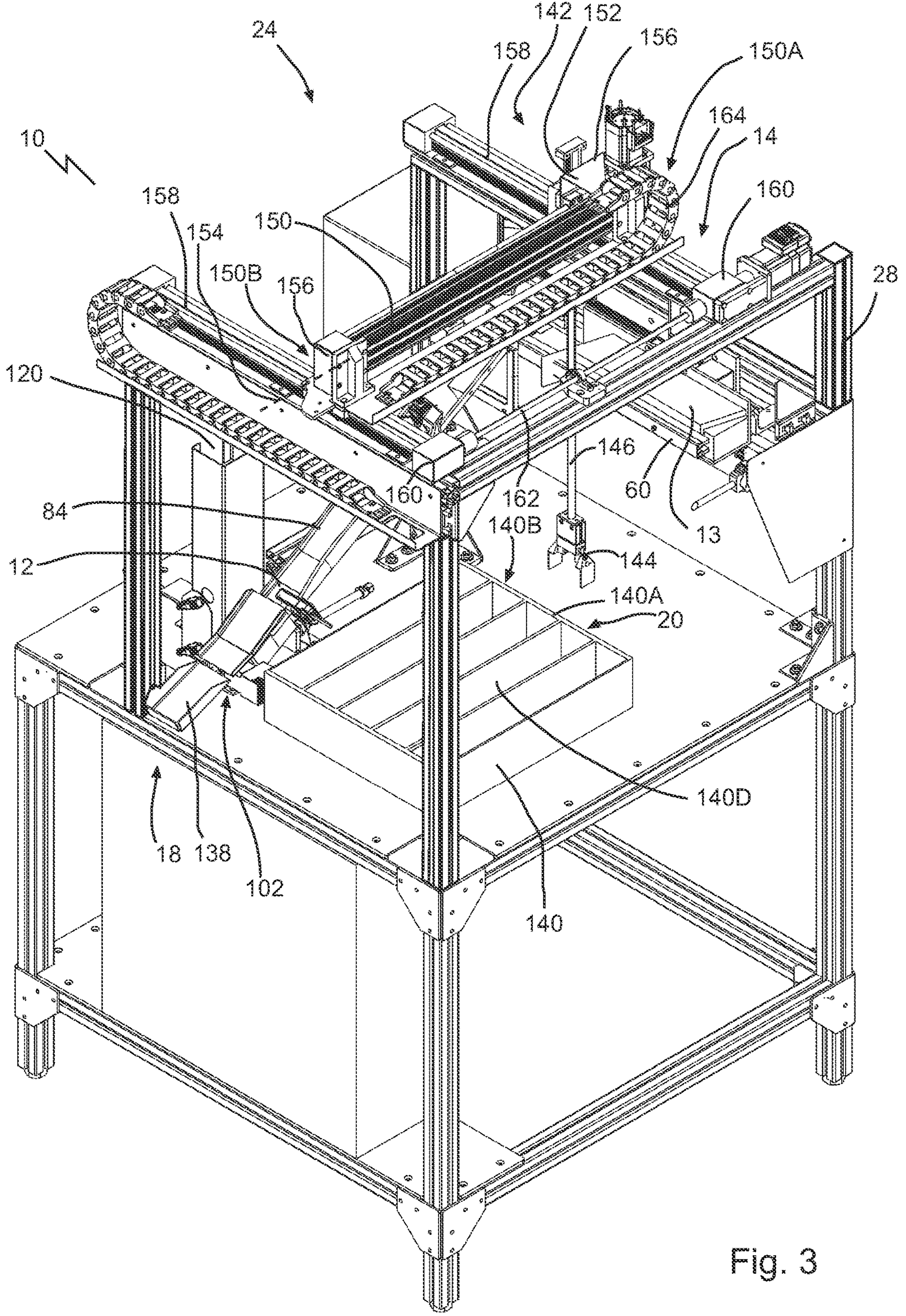
FIG. 3 is a rear perspective view of the trading card inventory management system of FIG. 2, with the housing removed.

Referring to FIGS. 1-29, a trading card inventory management system 10 is illustrated. Referring to FIGS. 1 and 2, system 10 may have a card receiver 14, for example a part or series of parts that may be used to input trading cards 12 into the system 10. System 10 may have a card identifier 16, which is a part or series of parts that may be used to extract information from each card 12, for the purpose of identifying the card 12 from a database of known cards 12. System 10 may have a card discharge 18, which is a part or series of parts that may be used to expel cards 12 from the system 10. System 10 may have a card storage 20. A storage 20 may be structured to store cards 12 in an ordered and compact fashion within the system 10, for example in batches stored in card boxes 120 in the examples discussed below. System 10 may have a card translocator 24, which may be controlled to move cards 12 around the system 10. The card translocator 24 may be structured to move trading cards 12 between the card receiver 14 and the card storage 20, for example to move cards 12 inputted and identified in the system into storage. The card translocator 24 may be structured to move trading cards 12 between the card storage 20 and the card discharge 18, for example to dispense selected stored cards 12 from inventory, or to dispense cards 12 inputted but not stored in the machine. System 10 may have a computer 22, for example for use in receiving sensor input and user commands, and in sending control signals to the various parts of the system 10. The computer 22 may have suitable parts, such as a storage medium 44, a processor 42, a power supply 40 (such as a plug and cable for connecting to the alternating current supply of a building), and a display 46. The storage medium 44 may store a card database 44A of known card 12 information, and/or an inventor database 44B of cards 12 stored and/or processed in system 10. The system 10 may incorporate one or more of a power supply 30, motor controllers 32, card sensors 36, and power and/or data connections 38 (such as universal serial bus (USB) connectors and cables).

Referring to FIGS. 1-29, the system 10 may have suitable structural parts. The system 10 may have a housing 26 enclosing one or more parts of the system 10. The housing 26 may have a suitable structure, such as defining a top 26A, side walls 26B, and various access ports or doors, such as tray input door 26C, card box door 26D, utility or storage access door 26E, and a discharge door 26F. The system 10 may incorporate a structural frame 28 for mounting various parts. The frame may have suitable parts, such as one or more of a base platform 28A, a gantry support sub-frame 28B, columns 28C and beams 28D for sub-frame 28B, a base support sub-frame 28E, columns 28F and beams 28G for sub-frame 28E, and ground engaging feet 28H.

Figure 32:
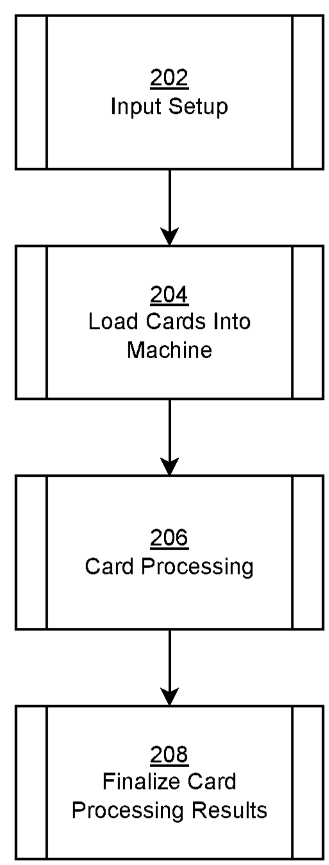
FIG. 32 is a flowchart of an example method of inputting trading cards into an inventory management system.

Referring to FIG. 32, a flowchart depicting an overall process of inputting cards using system 10 is illustrated. In a step 202, a user sets up the system 10 by inputting certain settings and data, to tailor the system 10 to the user's preferences. In a step 204, a plurality of trading cards 12 are then loaded into the machine (system 10). In a subsequent step 206, each card 12 is processed in the machine, for example image-analyzed, identified and catalogued for inventory or listing purposes using image-recognition software, or, if the card 12 cannot be identified, set aside. In a step 208, card input is finalized, for example by the computer 22 sending control signals to the card translocator 24 to store the cards 12 in a particular location within the card storage 20, or by sending control signals to discharge the processed cards 12.

Figure 33:
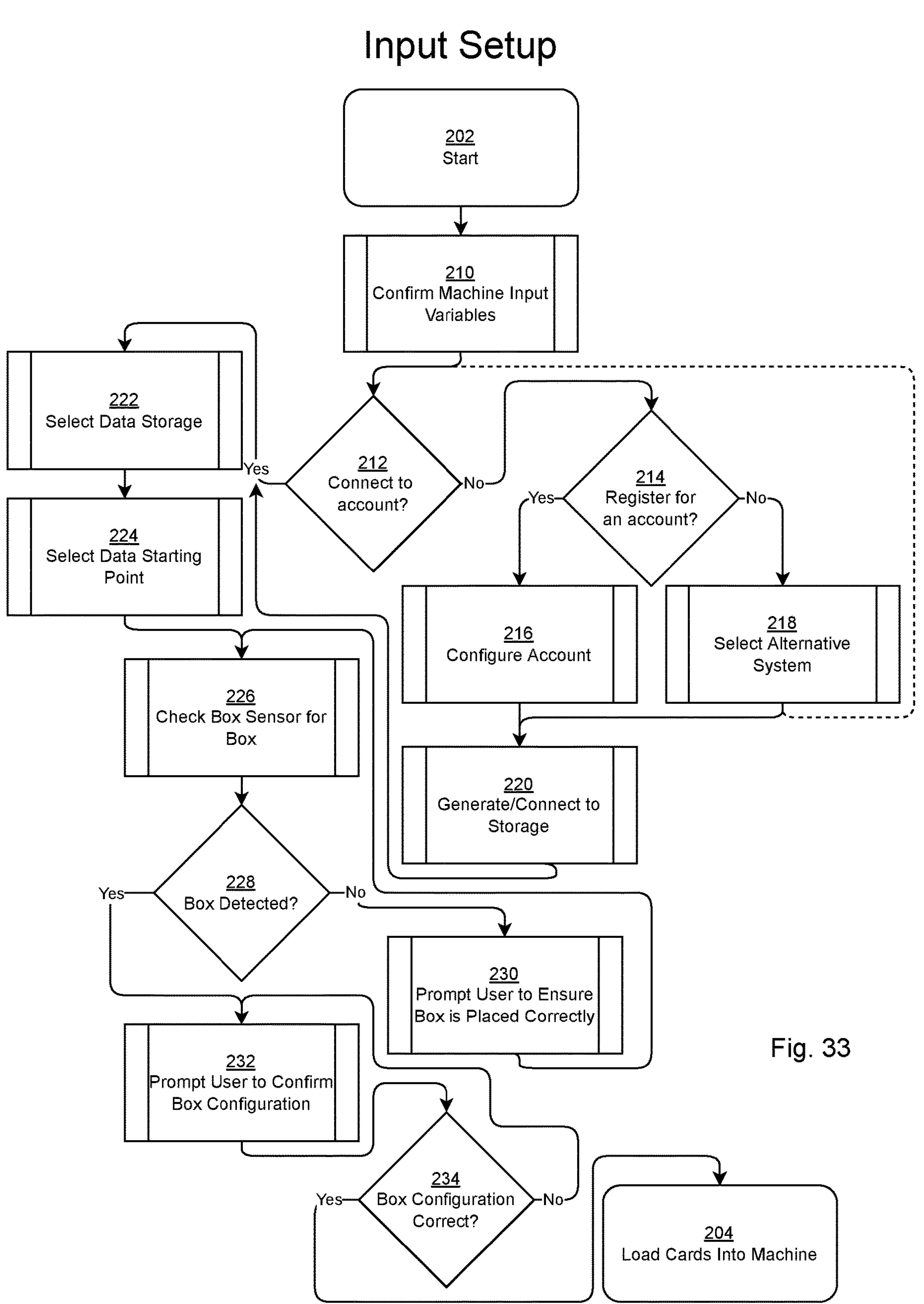
FIG. 33 is a flowchart of an example method of setting up a trading card inventory management system.
Figure 40:
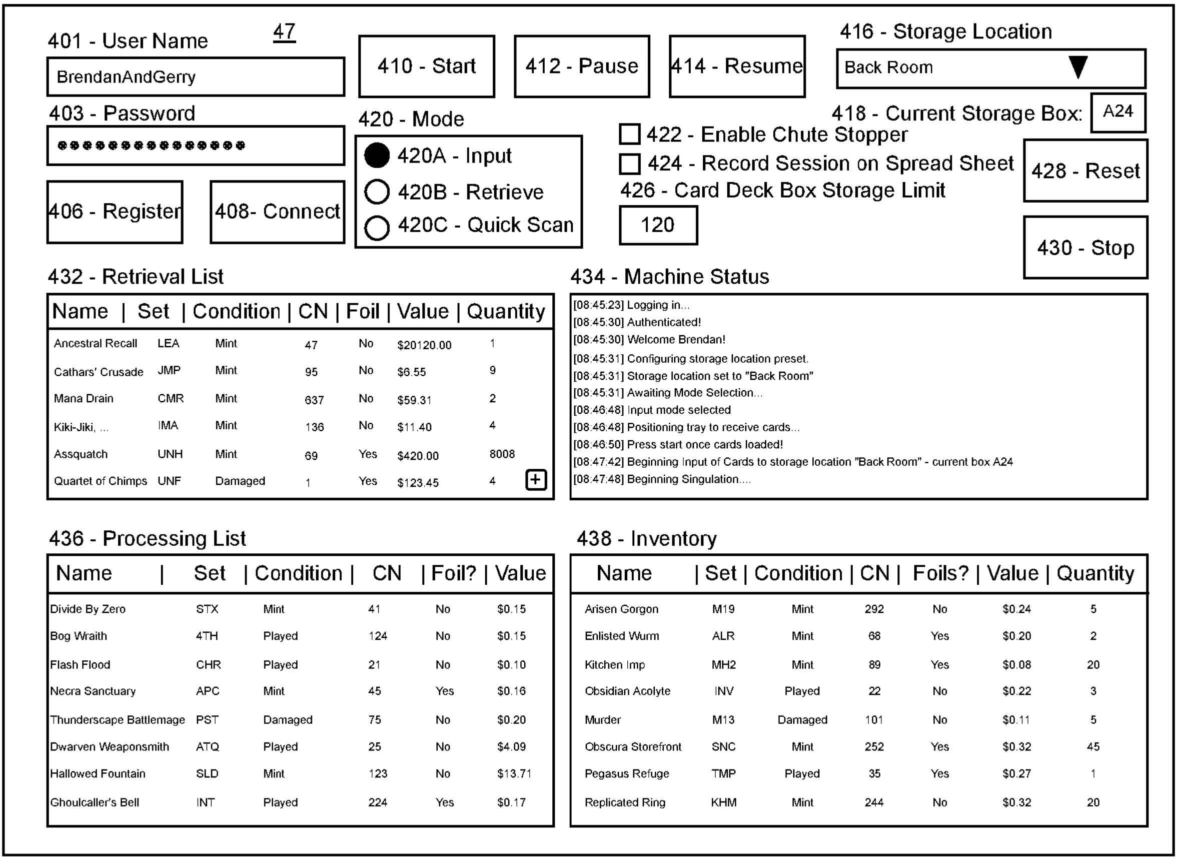
FIG. 40 is a screenshot of an example display and user interface for use with the trading card inventory management system of FIG. 3.

Referring to FIGS. 33 and 40, a flowchart (FIG. 33) is illustrated depicting various sub-steps that may be carried out in the system 10 configuration step 202 (FIG. 32), for example using commands entered via a user interface 47 (FIG. 40) at display 46. The example method may be carried out at a suitable point in the operation of system 10, such as shortly after purchasing or acquiring a system 10, in order to tailor the functioning of the system 10 to the user's needs. The user interface 47 of FIG. 40 is provided as an example of how a user may input commands to carry out step 202, however, other suitable user input devices and interface layouts may be used.

Referring to FIGS. 33 and 40, a user of the card inventory management system 10 may, in a step 210, configure the functioning status and proper configuration of certain operational variables. Example variables that may be checked for readiness may include, at a high level, motor function status for all actuators, card box 120 supply above minimum level, card tray 60/card receiver 14 location and status, card translocator 24 location and status, discharge 18 status, camera 88/92 status, computer 22 status. Within each level, the status and configuration of each sub-variable may be checked, for example, within the card receiver 14, the tray 60 location and status may be checked, the status of card singulator 70 may be checked, and so on. For each variable, the system 10 may review whether the variable is within an appropriate predetermined range or value, and if not, may send control signals to the respective part to correct any such deviation. Once the system 10 confirms that all applicable variables are properly set, the process may continue.

Referring to FIGS. 33 and 40, the process may include a login and/or connection step 212. With the user interface 47, the system 10 confirms whether the user has connected to an account for that user. A user may provide various login details using interface 47, for example one or more of a user name (field 401), and password (field 403), with the user submitting such information via a suitable method such as pressing a connect button 408. In some cases, a user may also or instead enter an account string or number for the user, or the system 10 may recognize the user's login and associate such use with a particular account. The system 10 may recognize the user as an authenticated user. The user may have an already existing account, such as one tied to the card inventory management system 10. The user can then be authenticated with the card inventory management system 10. If the user successfully authenticates, the process may proceed to step 222 discussed below. The system 10 may announce the authentication within a displayed status log field 434, for example to convey various information to the user, such as data storage options, machine variable status, inventory settings, operational settings, and others. Alternatively, if the user login is not recognized, the user may be prompted to re-enter login information, or create an account, for example in a step 214. The user may also independently choose to set up an account, for example by pressing a register button 406 to submit a register request to the system 10. The user may choose whether an account is needed, or to use an alternative method to connect to a data storage highlighted by steps 214 through 220 in the flowchart.

Referring to FIGS. 33 and 40, a user may choose not to connect with an existing account and may inform the card inventory management system 10 whether they would like to use a database at all, represented by step 214. For example, a user may select from a prompt by the machine asking the user whether the user needs to use or set up an account, after which the user may initiate the setup of an account by clicking a button 406 labelled for registration. Alternatively, if the user does not wish to set up an account, the user may proceed via step 218 to select one or more alternative methods to handle the output of the card inventory management system 10. Independent or dependent of account entry, the user may be prompted to input configuration information such as card deck box storage limit (referring to how many cards may be stored in a card box 120, for example by entering a respective value in field 426), card box minimum limit (referring to the minimum number of cards to be stored in a card box 120 in storage 20) or the equivalent, depending on the size of card boxes used and the user's preferences. The user may enable the use of the chute stopper 96, for example by initiating an enable chute stopper button 422 on the interface 47. The user may enter, and/or the system 10 may display, a storage location via a field 416, for example to identify the location of the system 10, which may be associated with the respective account.

Referring to FIGS. 33 and 40, if the selection from the user in step 214 resulted in the need of an account, such an action would proceed the user down a path of account creation, at which point the system 10 would likely request information required to set up the account, such as by creating a username, password, entering billing and payment details, contact information, addresses, configuration preferences, and other related business details, as desired. The user may have the option to configure a database for use, represented by step 216. As an example, a user may be prompted to create an account with a database provider, such as operated by the computer 22 or a server host computer 50, by entering data determined relevant to an account into the card inventory management system 10. Upon successfully entering the requisite information and the information passing certain minimum substantive requirements, the system 10 may proceed to step 220 to generate and connect the machine to the relevant data storage location for the newly created account.

Referring to FIGS. 33 and 40, if the selection from the user in step 214 represented the desire not to have an account, the execution path may proceed down to step 218 where the user may be prompted that it will output the card processing session information in an alternative format. An example is the card inventory management system 10 locking storage functionality and possibly generating a warning to the user through a secondary dialog box. The warning dialog may indicate to the user that the session is not saved to an account and will be generated as a spreadsheet, a list, a printed document, or in another suitable format. Upon the user acknowledging and indicating a desire to proceed, the card inventory management system 10 may proceed in the alternative configuration selected, updating any configuration variables as required, for example to lock storage or limit output functionality. In some cases, the user may request that the session be recorded on a spreadsheet or other suitable media, for example by initiating a respective button 424. Regardless of whether an account is initiated or not, the system 10 may proceed to the next step, which depending on the pathway chosen, may include connecting to storage in a step 220.

Figures 27, 28:
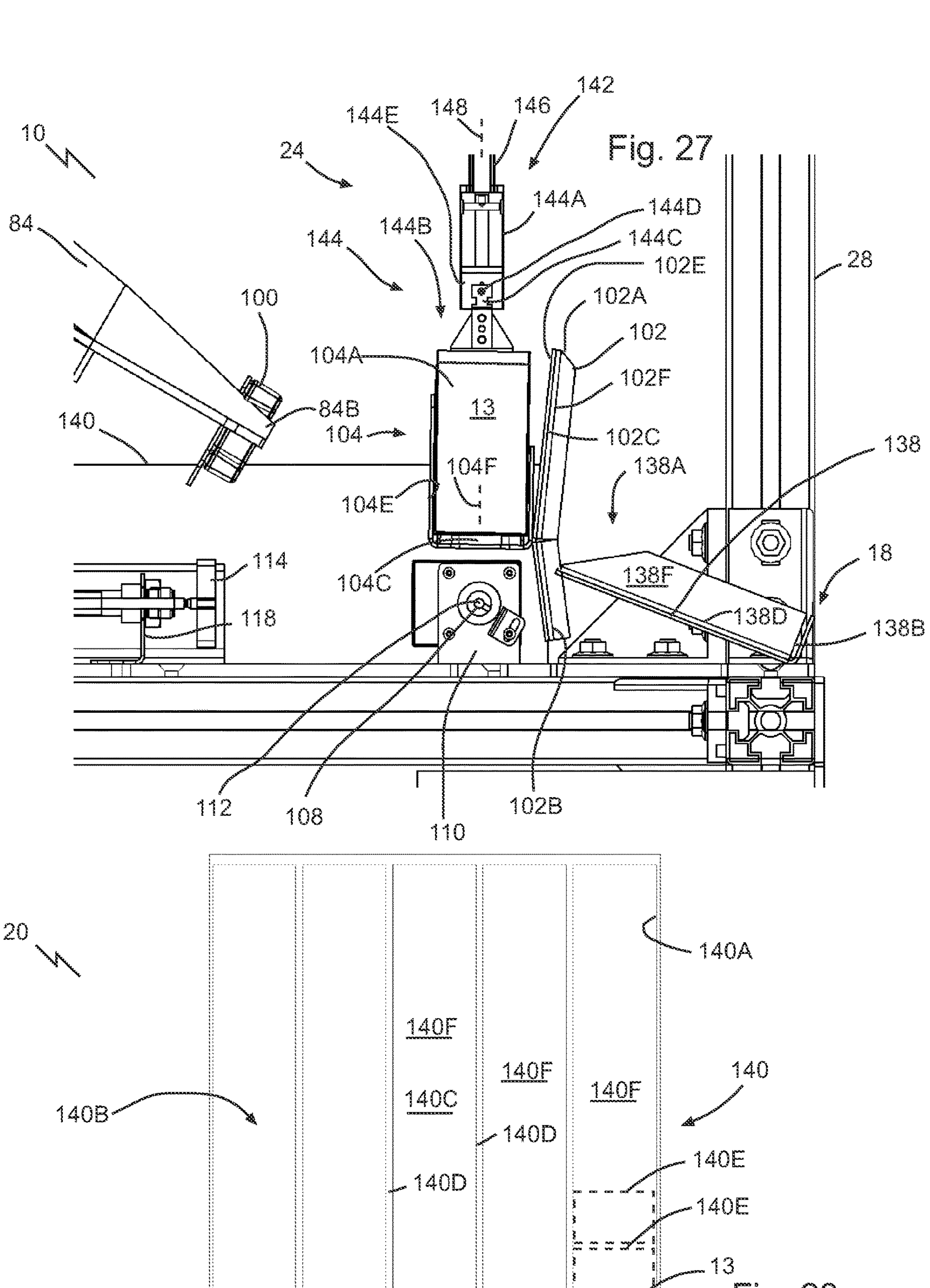
FIG. 27 is a cross-sectional view taken along the 27-27 section lines of FIG. 8, with the card guide moved into a card storage position.
FIG. 28 is a top plan view of a card storage of the trading card inventory management system of FIG. 3.

Referring to FIG. 33, system 10 may proceed to set up the storage configuration. In step 222, the machine may successfully access a provided data storage medium, such as a database saved on medium 44 or 48A using the provided connection information. In some cases, the user may at this point be provided access and information on the contents of the storage 20, for example by displaying the information to the user, such as via an inventory field 438, which may list one or more types of information on the cards 12 stored in the storage 20. The system 10 may proceed to select a data starting point at step 224. Referring to FIG. 28, for example, the system 10 may identify (either by diagnostic methods or previous settings) where the next empty card bay 140E and card row 140F. In some cases, for example where the most recent card box 120 is stored in a bay 140E without a full capacity of cards 12, the translocator 24 may obtain such box 120 and load the box 120 into the card catcher 104 in order to continue adding cards 12 to that box 120 for maximum storage efficiency. The system 10 may keep track of which bays 140E are open and which are occupied, including whether the boxes 120 in such bays 140E have capacity for more cards 12 or not. Referring to FIG. 40, in some cases the interface 47 may display the present storage box 120, for example in a field 418. The example shown uses a numbering system of XX ##, where XX is a row character and ##is a bay number in the respective row, although other indexing methodologies can be used.

Referring to FIG. 33, the system 10 may check the status of and configure the card box supply. The system 10 may check the box sensor(s) 134 as an indication of how many card boxes 120 are loaded in the card box supply frame 122. In some cases, the system 10 may identify how many boxes 120 are loaded, and in others, the system 10 may only inform the user of the card box 120 supply dropping below a minimum level, such as two boxes 120 remaining in frame 122. If the system 10 detects boxes 120 or a sufficient number of boxes 120 in step 228, the system may move forward in the process. If the system 10 detects no boxes 120 or below a minimum level of boxes 120, the system 10 may prompt the user to ensure that the box 120 is placed correctly, or to add a box 120 if no box 120 is present. If box(es) 120 are detected, then the system 10 may move to step 232 to prompt the user to confirm the box 120 configuration, in case the user has, in the meantime, gone into the machine and moved a box manually after setting variables. The system 10 may then check whether the box 120 configuration is correct, and if so proceed to step 204 or another suitable step in the process. Referring to FIG. 40, the user may be permitted to stop the operation of the machine at any time, for example via a button 430. The user may reset the system 10, for example reset the configurations entered into system 10, via a button 428.

Referring to FIGS. 32-34 and 40, the user may use system 10 to input and/or process trading cards 12, for example in a step 204. Referring to FIG. 40, the user may configure the system 10 to input cards, for example by selecting an input entry checkbox 420A in a mode field 420 of the display. Referring to FIGS. 1-3, 8, 10-19, the user may begin by loading one or more cards 12 into the card receiver 14, for example into loading tray 60. The card receiver 14 may comprise a card stack tray 60 and a card singulator 70, which is structured to advance one card at a time from the card stack tray 60 into the card identifier 16. The user may be required to first open a card loading door 26C of housing 26, to access the tray 60 from outside the housing 26 (FIG. 2). In some cases, the door 26C may provide or be adjacent a manual entry port for a user to feed one card 12 into the card identifier at a time.

Figure 8:
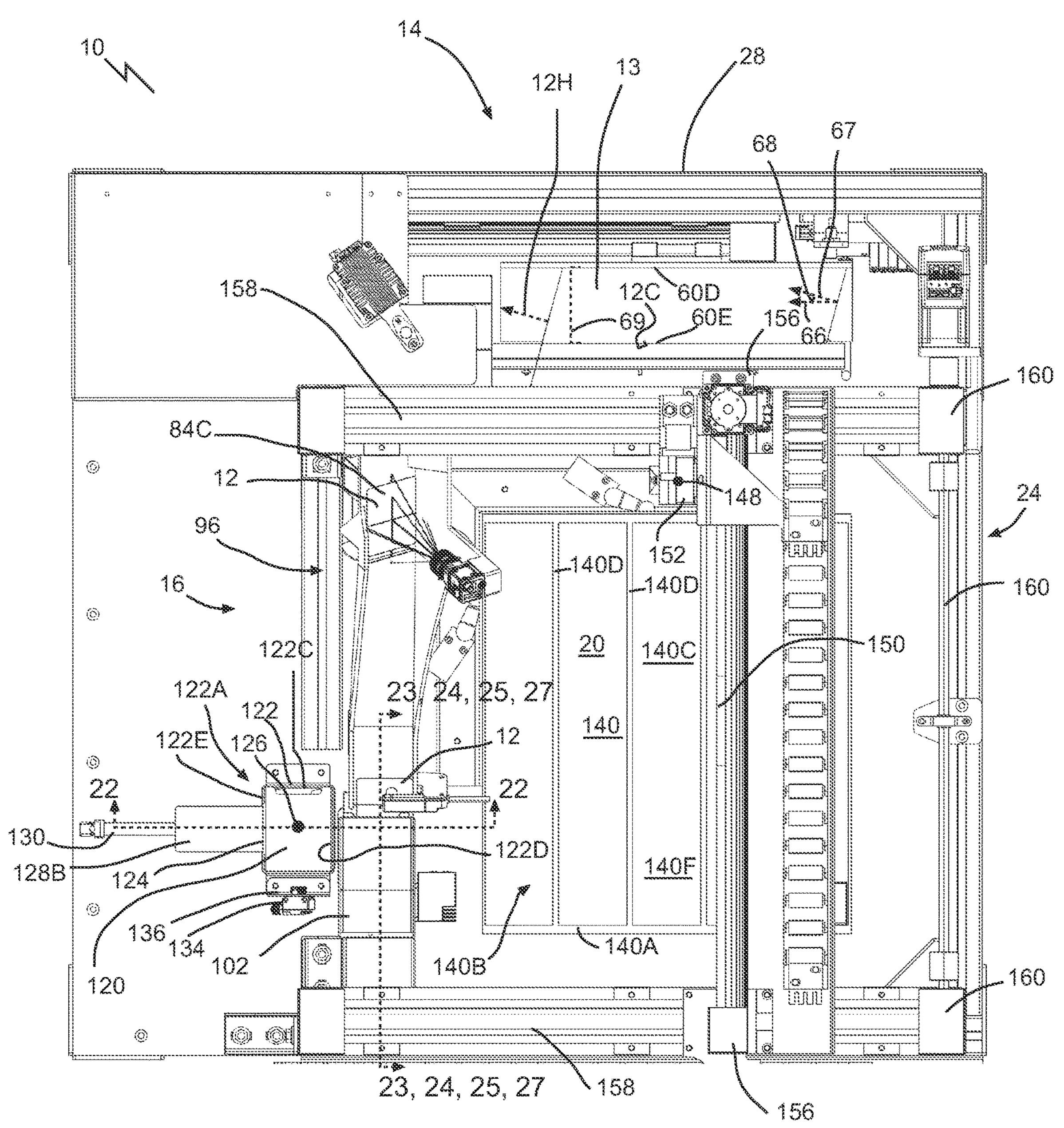
FIG. 8 is a top plan view of the trading card inventory management system of FIG. 3.

Referring to FIG. 8, the cards 12 may be arranged in a stack 13, in a suitable configuration. For example, the cards 12 may rest in an upright orientation on edge, such as on side edges 12C upon the base surface of the tray 60, and top and bottom edges 12D fitted against the guide walls 60D and guide brushes 60E, respectively. Other orientations of cards 12 in tray 60 may be used. The rear or front faces 12A and 12B may be oriented in a suitable fashion, for example, the front faces 12A directed to shoulder 60C of tray 60. The stack 13 of trading cards 12 may rest upon a rear shoulder 60C of the card stack tray 60 distal the card singulator 70.

Referring to FIGS. 8 and 9-19, the tray 60 may have suitable characteristics and parts. The tray 60 may define opposed ends, such as open leading end 60A, and trailing end 60B defining trailing shoulder 60C. The tray 60 may be mounted to translate along axis 66, for example rail grippers 60F may be mounted to slide along a guide rail or rails 62 to actuator 64.

Referring to FIG. 8, the card stack tray 60 and/or card receiver 14 may be structured to skew the stack 13 of trading cards 12 relative to a card advancement axis 66 defined by the card stack tray 60. The use of skew reduces friction between adjacent cards at the leading end of the stack 13, making it more likely that the singulator 60 is able to separate one card from the stack 13 at a time. In the example shown, the rear shoulder 60C defines a normal axis 67 that is offset by a skew angle 68 of about thirty-five degrees relative to the card advancement axis 66. Other skew angles may be used such as between one and eighty-nine degrees. The lateral separation distance 69 between walls 60D and brushes 60E may be adjusted, and/or selected to be less than or equal to the length of the cards 12 defined between top and bottom edges 12C of the cards, for example less than the length of the cards 12 in order to support the cards 12 assuming a skewed orientation as shown. In other cases, the cards 12 may assume an orientation perpendicular to the advancement axis. The lateral limits provided by walls 60D and brushes 60E or equivalents need not be small enough to contact the cards 12, for example the brushes 60E may be spaced from the edges 12D as shown in the embodiment of FIG. 30.

Figures 13, 14, 15:
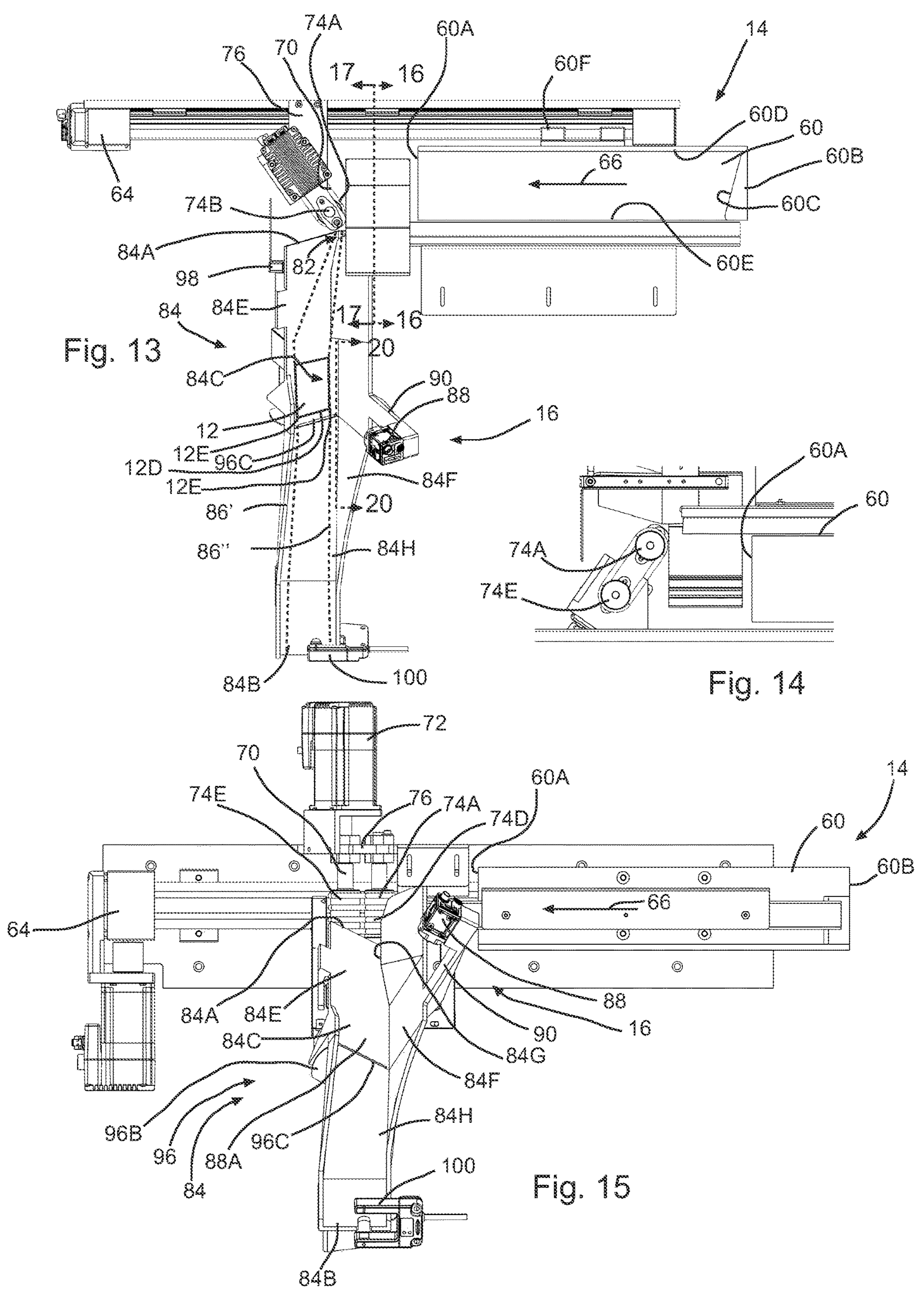
FIG. 13 is a top plan view of the combination of FIG. 10.
FIG. 14 is portion of a bottom plan view of the combination of FIG. 10 illustrating the card singulator.
FIG. 15 is a front elevation view of the combination of FIG. 10.
Figures 16, 17:
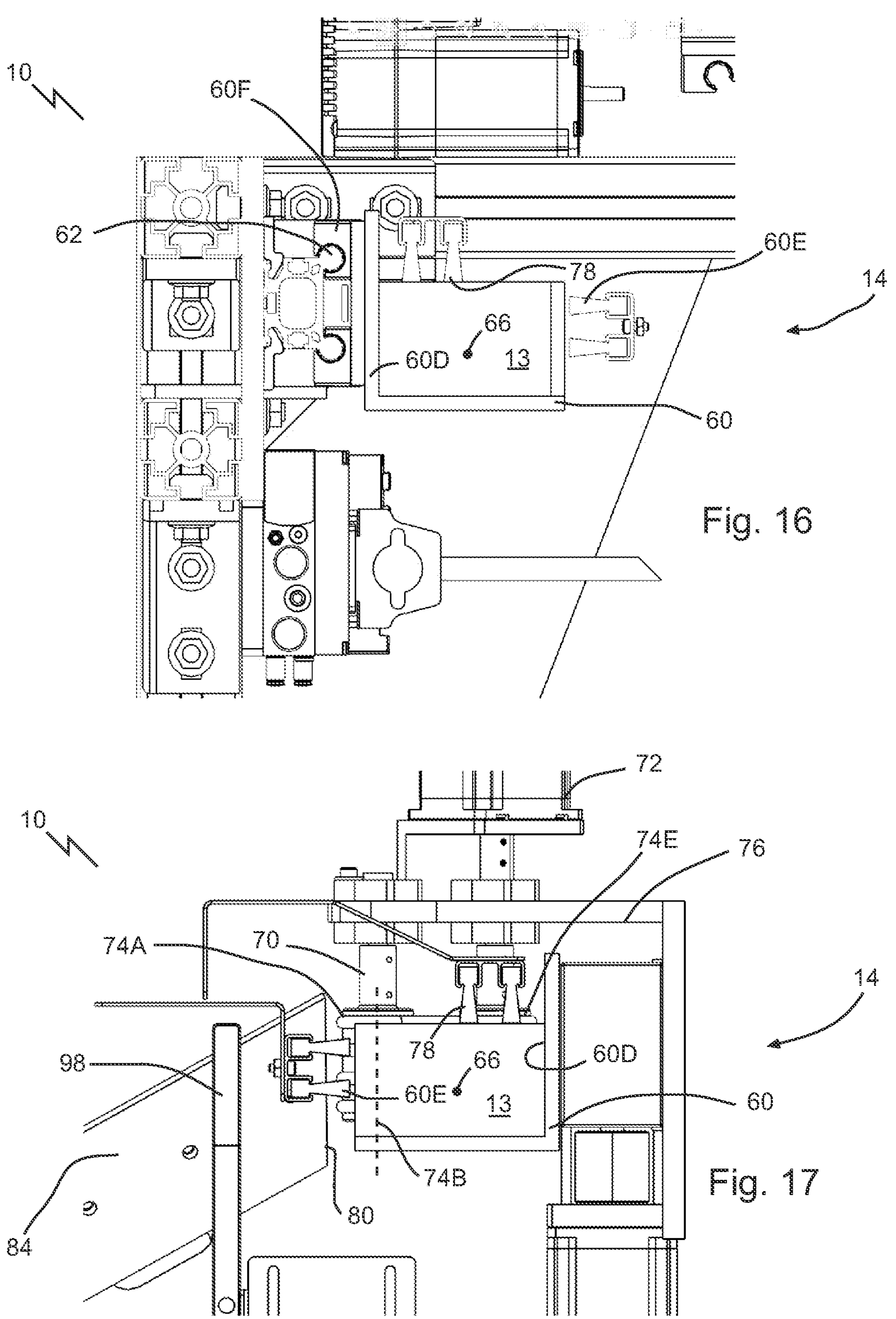
FIG. 16 is a cross-sectional view taken along the 16-16 section lines of FIG. 13.
FIG. 17 is a cross-sectional view taken along the 17-17 section lines of FIG. 13.
Figures 29, 30:
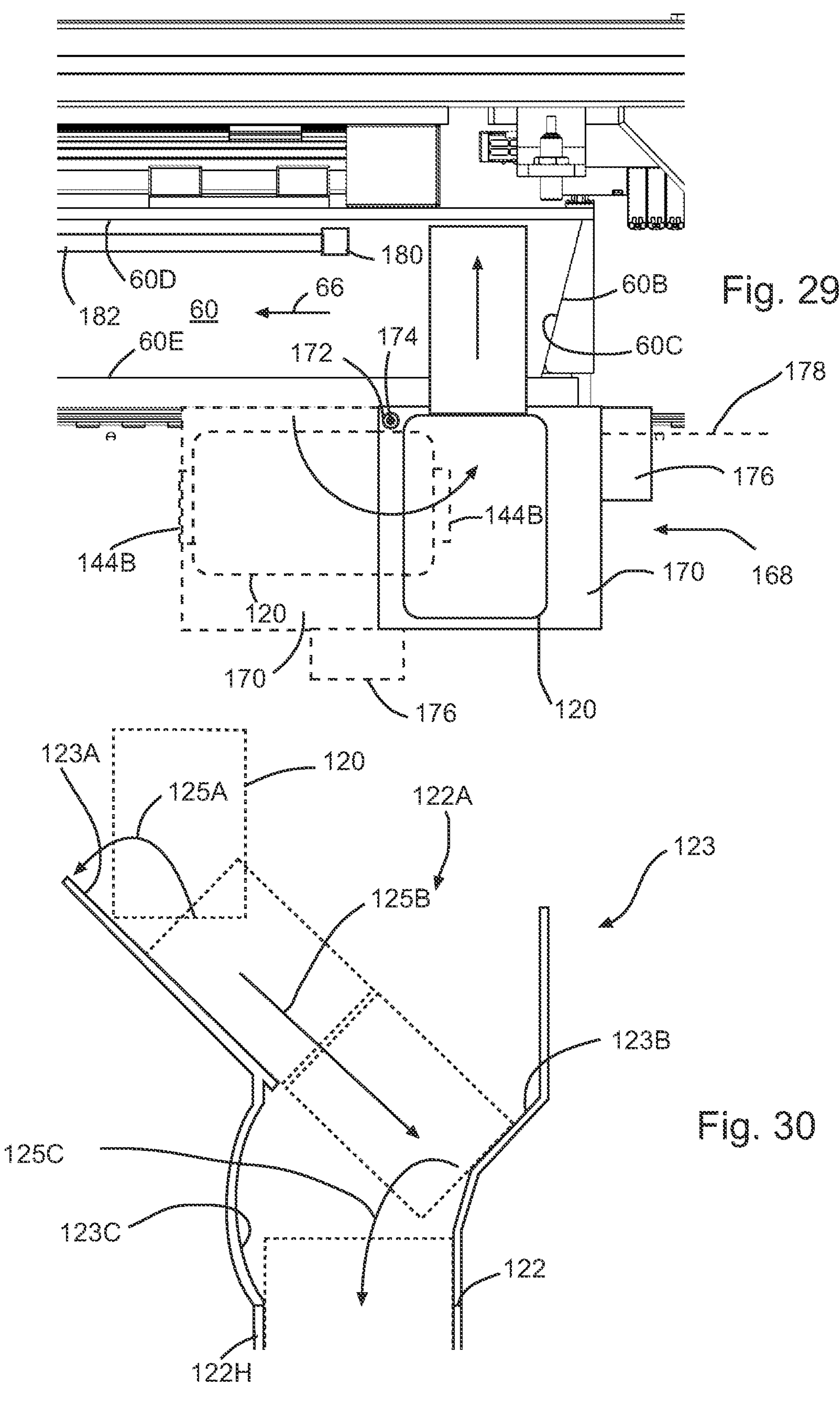
FIG. 29 is a top plan view of a card re-loading system for dispensing a stack of cards from a stored card box back into the loading tray of the card receiver of the trading card inventory management system of FIG. 3.
FIG. 30 is a side elevation view of another embodiment of a card box supply stack of the trading card inventory management system of FIG. 3, adapted to permit the card translocator to reload empty card boxes back into the supply stack.
Figure 31:
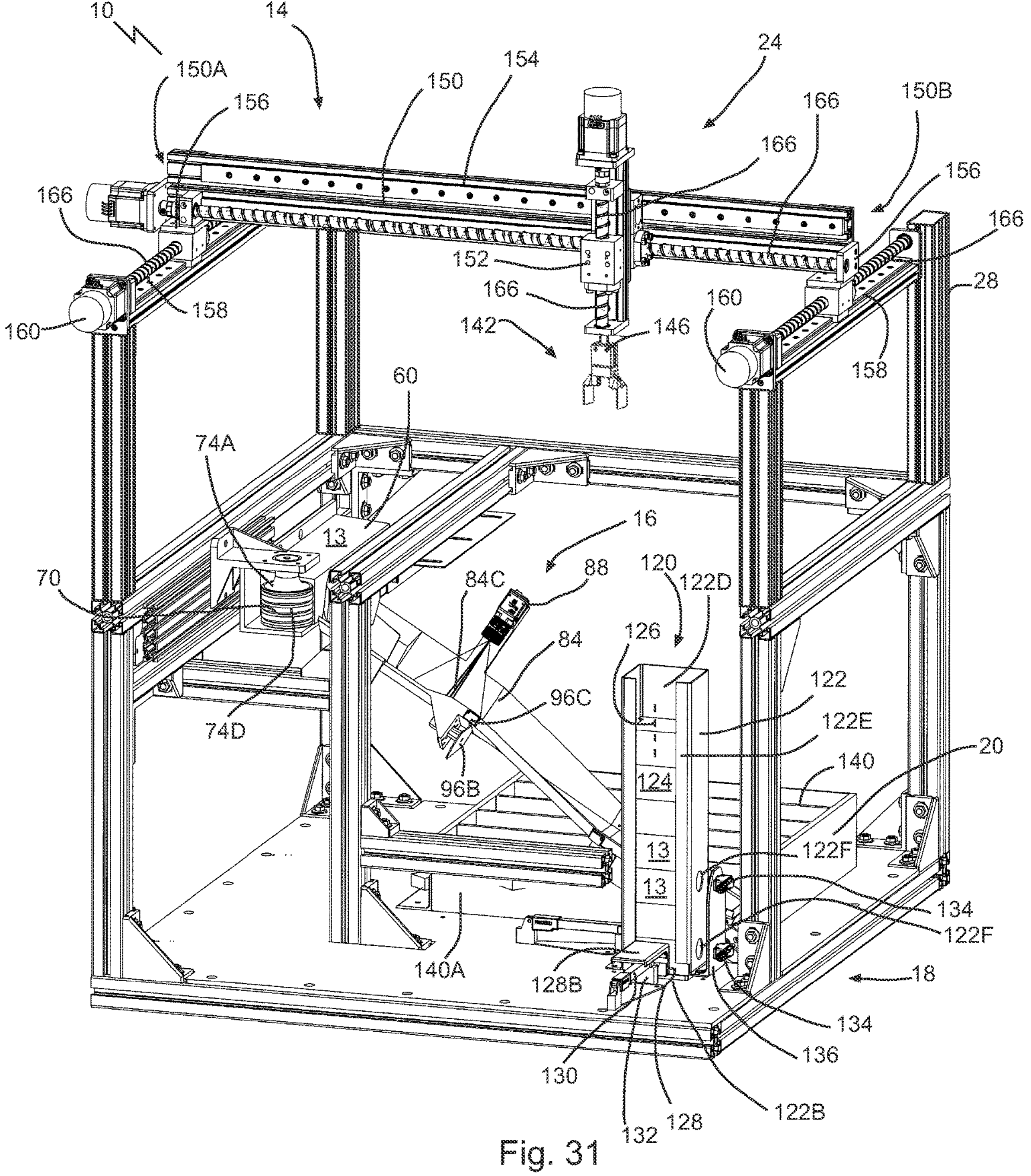
FIG. 31 is a perspective view of another embodiment of a trading card inventory management system, with linear screw actuators used on the gantry instead of the conveyor actuators of FIG. 3, and with a single roller used for the card singulator instead of the drive and contact rollers of FIG. 3.

Referring to FIG. 29, in some cases the system 10 may, for example under command by the user or computer 22, manipulate the cards 12 to retain the cards 12 in a controllable stack 13. For example, the system 10 may apply a mild compression upon the stack 13 along the axis 66, for example, a plunger 180 may be advanced via an actuator 182 to contact the rear face 12B of the leading card of the stack 13. Referring to FIGS. 8 and 13, in another example, the tray 60 may be moved relative to the singulator 70, for example via translating the tray 60 along axis 66 to bring the leading card 12 into contact with the singulator 70 using tray actuator 64.

Figure 34:
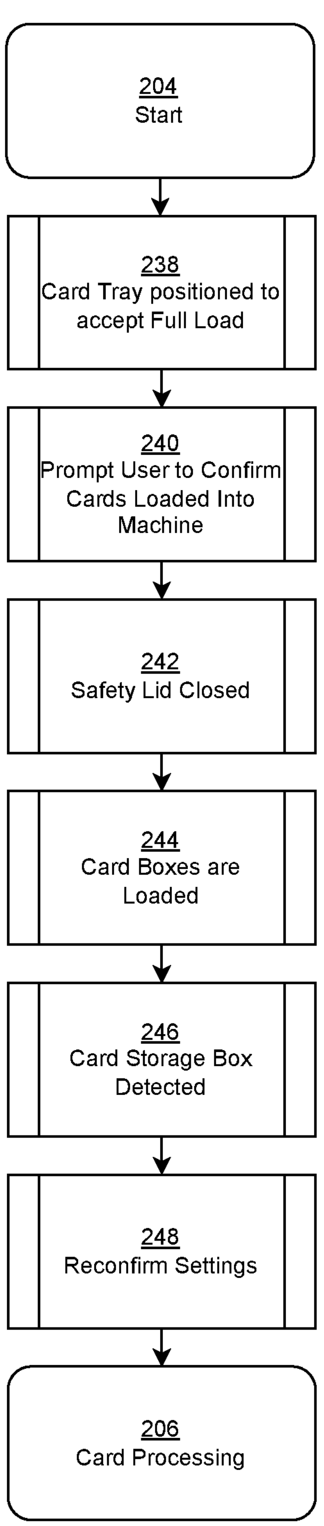
FIG. 34 is a flowchart of an example method of further set up of a trading card inventory management system.
Figure 35B:
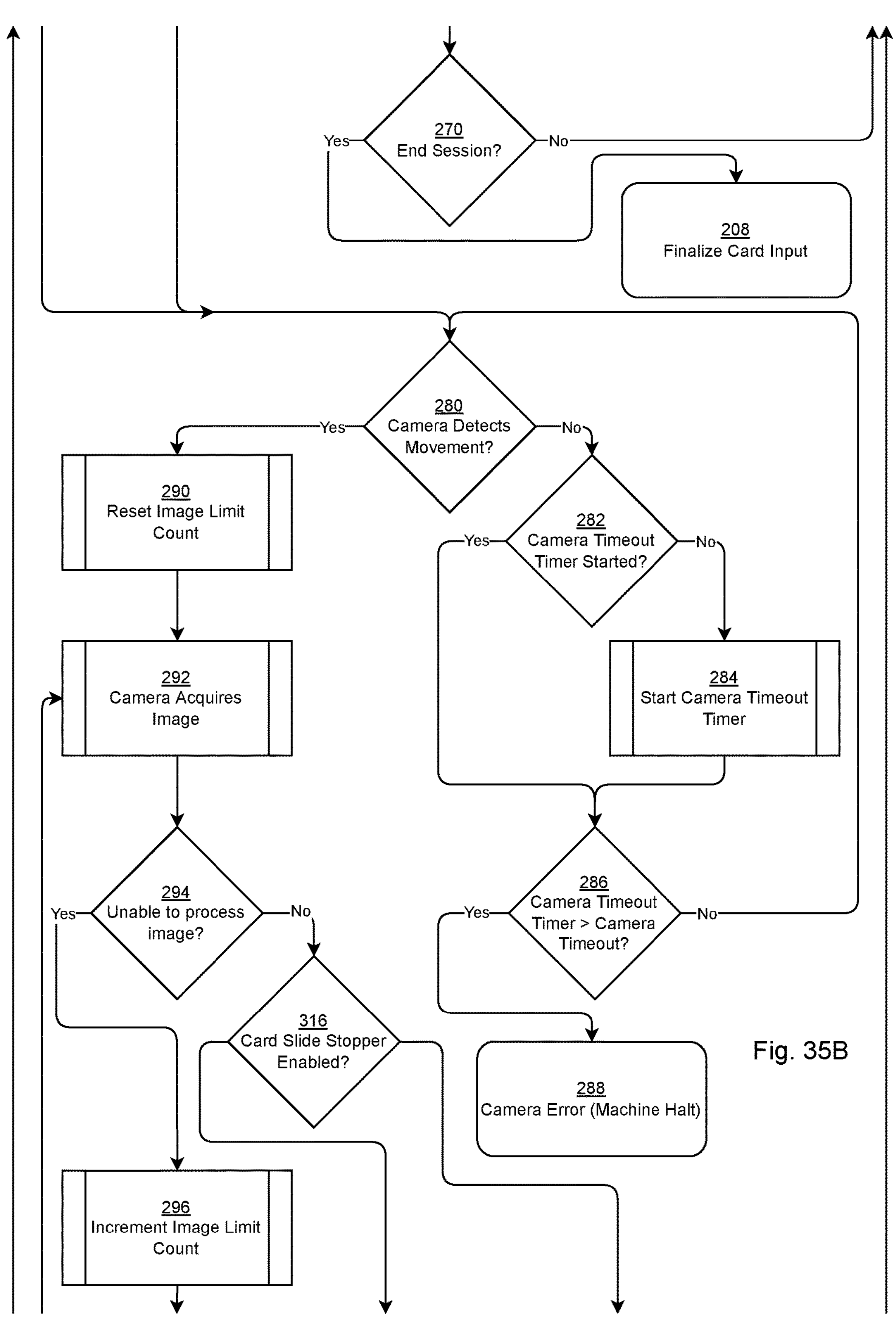
Figure 35C:
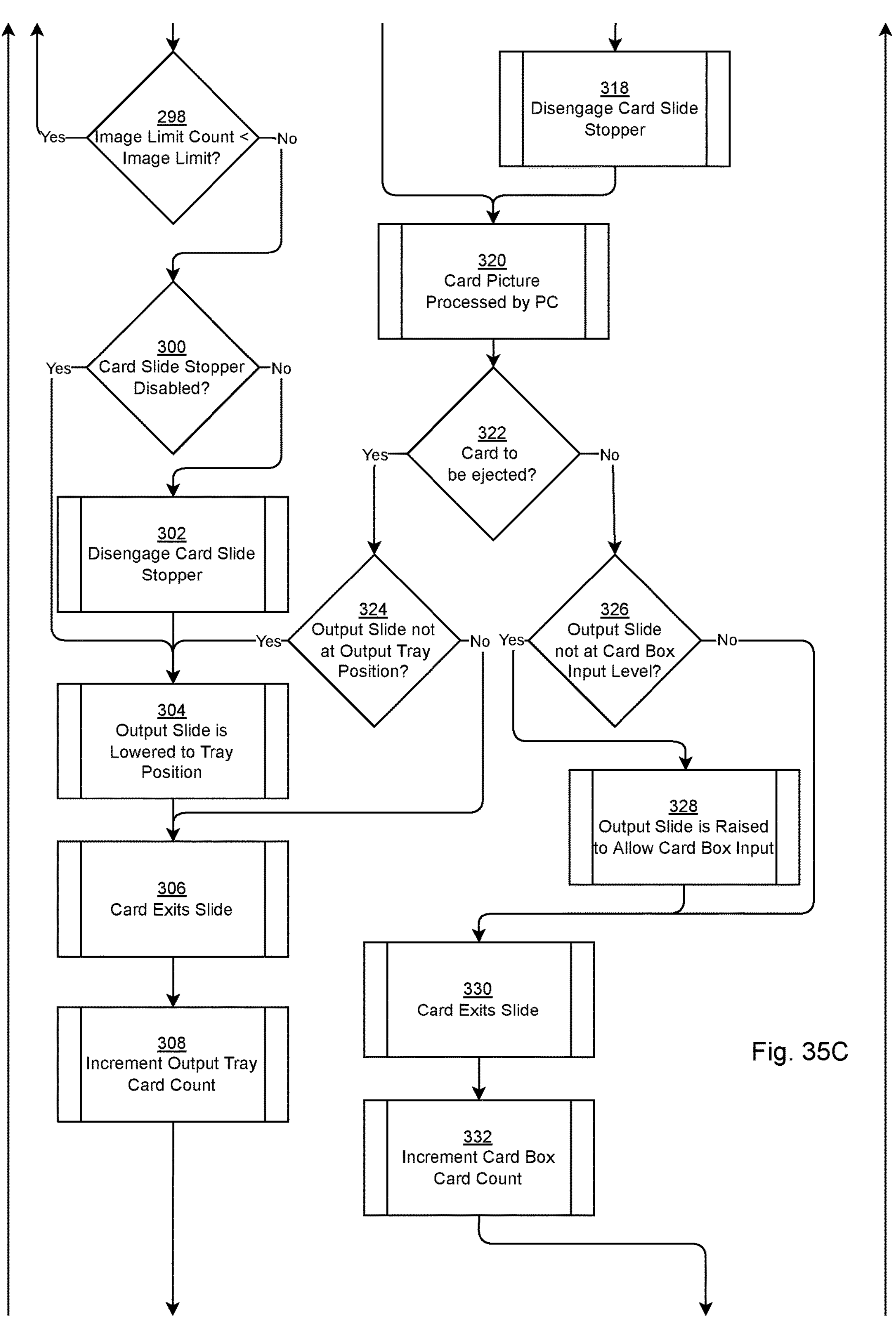
Figure 35D:
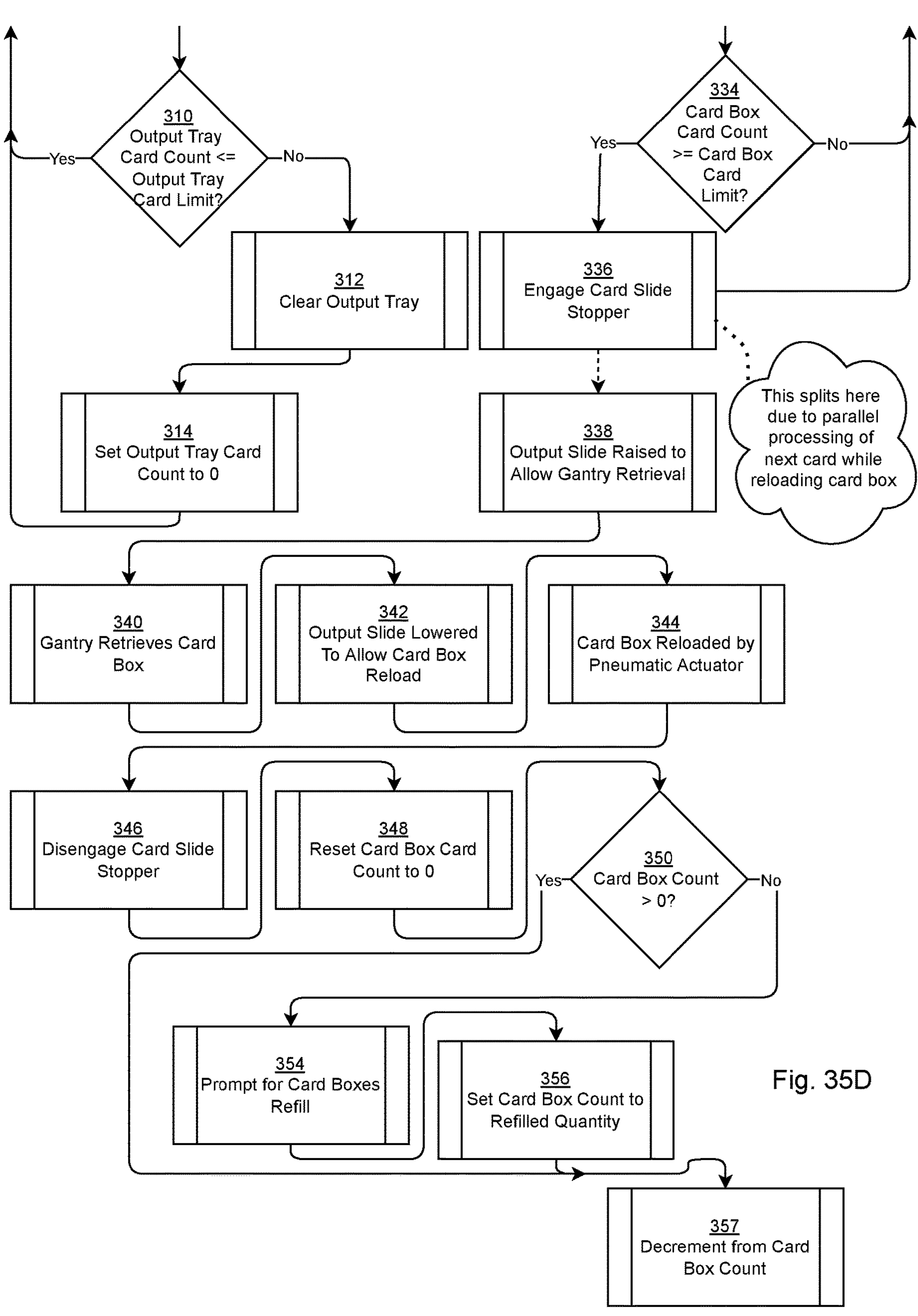

Referring to FIG. 34, the system 10 may run a series of checks prior to beginning to process cards 12. In a step 238, the system 10 may confirm whether the cards tray 60 is positioned to accept a full load of cards 12. Step 238 may be carried out prior to or after cards 12 are loaded into the tray 60. The analysis may be carried out by receiving signals from the motor controller (not shown) of actuator 64, to inform the computer 22 of the step at which the actuator 64 is upon, to determine whether the actuator 64 is in a home position, and sending any signals to actuator 64 to move the tray 60 into home if the tray 60 is out of home position. In a step 240, the system 10 may confirm, or ask the user to confirm, whether cards are loaded into the machine properly. Referring to FIGS. 34 and 40, such confirmation may be requested in a suitable dialog box field 434, and the user may confirm such loading by pressing the start button 410. Should the user wish to pause or resume the processing, the user may submit control signals via the interface 47, for example using pause or resume buttons 412 and 414, respectively. Referring to FIGS. 1 and 34, the system 10 may in a step 242, confirm whether the safety lid (door 26C) is closed. In some cases, the system 10 will halt operations if, during processing, the safety lid (door 26C) or other suitable doors are opened, to minimize the chance of malfunction by misuse, or user injury. In a step 244, the system 10 may also confirm whether a card storage box 120 is loaded, for example in tower frame 122, and/or card catcher 104. In a step 246, the system 10 may confirm whether the storage housing 140 or box is present in the system 10. In a step 248, the system 10 in a step 248 may reconfirm settings, for example by checking each sensor output, and/or displaying such operational status to the user to provide the user with an opportunity to reconfirm that all systems are go for processing. In a step 206, the system 10 then may be used to process cards 12.

Referring to FIGS. 1-3, 8, 10-19, 35A and 40, structure and process is illustrated for processing cards 12, beginning in step 206. In step 256, the feeder motor, for example actuator 64, may be actuated to move, for example translate, the stack 13 of trading cards 12 laterally relative to the card singulator 70. Translation of tray 60 and cards 12 may be along a card advancement axis 66 defined by the card stack tray 60.

Referring to FIGS. 1-3, 8, 10-19, 35A and 40, the cards 12 may be individually separated for processing using a card singulator 70. The card receiver 14 may be structured to orient the stack 13 of trading cards 12 within the card stack tray 60 to direct cards 12 to move one at a time out of the stack 13, as above. In use the cards 12 may advance into contact with the card singulator 70. In a step 258, the system 10 may initialize the singulator 70, for example. The card singulator 70 may comprise a rotating guide, such as a roller, for example card a contact roller 74A. Roller 74A may be a vertical roller as shown, for example with a roller axis 74B that is vertical. The axis 74B may be oriented perpendicular to the normal axis 12H of the card 12. The roller 74A may be disposed along the card advancement axis 66 of the card stack tray 60, for example disposed in an advancement path of the cards in the tray 60, in order to contact cards 12 as they advance. The roller 74A may be structured to grip the cards 12, for example using texture or gripping parts, such as rubber bands 74D. The roller 74A may be driven by a suitable transmission, such as provided by a drive roller 74E connect via a belt as shown. A motor 72 or other actuator may be structured to drive the roller 74A in a step 258, for example via the roller 74E. The motor 72 may be mounted to the frame 28 by a suitable method such as a bracket 76.

Referring to FIGS. 2-3, 8, and 10-19 the singulator 70 may be structured to grip and pass a single card 12 at a time to the identifier 16. The singulator 70 may cooperate with one or more guides, such as guide brushes 78, to increase the skew of the cards 12 that lead into the singulator 70. The card receiver may orient a leading face, such as faces 12A or 12B, of the trading card 12 against the card singulator 70. The brushes 78 may be oriented to lightly contact the edges 12C of the leading cards 12, adjacent or at the end edges 12D opposite the end edges 12D of the leading cards 12 that feed into the singulator 70. By acting on one half of the card 12, a light torque is applied to the leading cards 12 to skew the cards 12 more than they are already skewed relative to axis 66, to assist with the separation of the cards 12 upon singulation. The brushes 78 are an example of a part that applies a mild shearing force on the cards 12, however, other parts may be used to apply force directly against the faces 12A or 12B of the cards 12 for a more direct torque/skew enhancement. As the skew increases, the leading edge of the leading card 12 separates more and more from that of the following card 12.

Figures 18, 19:
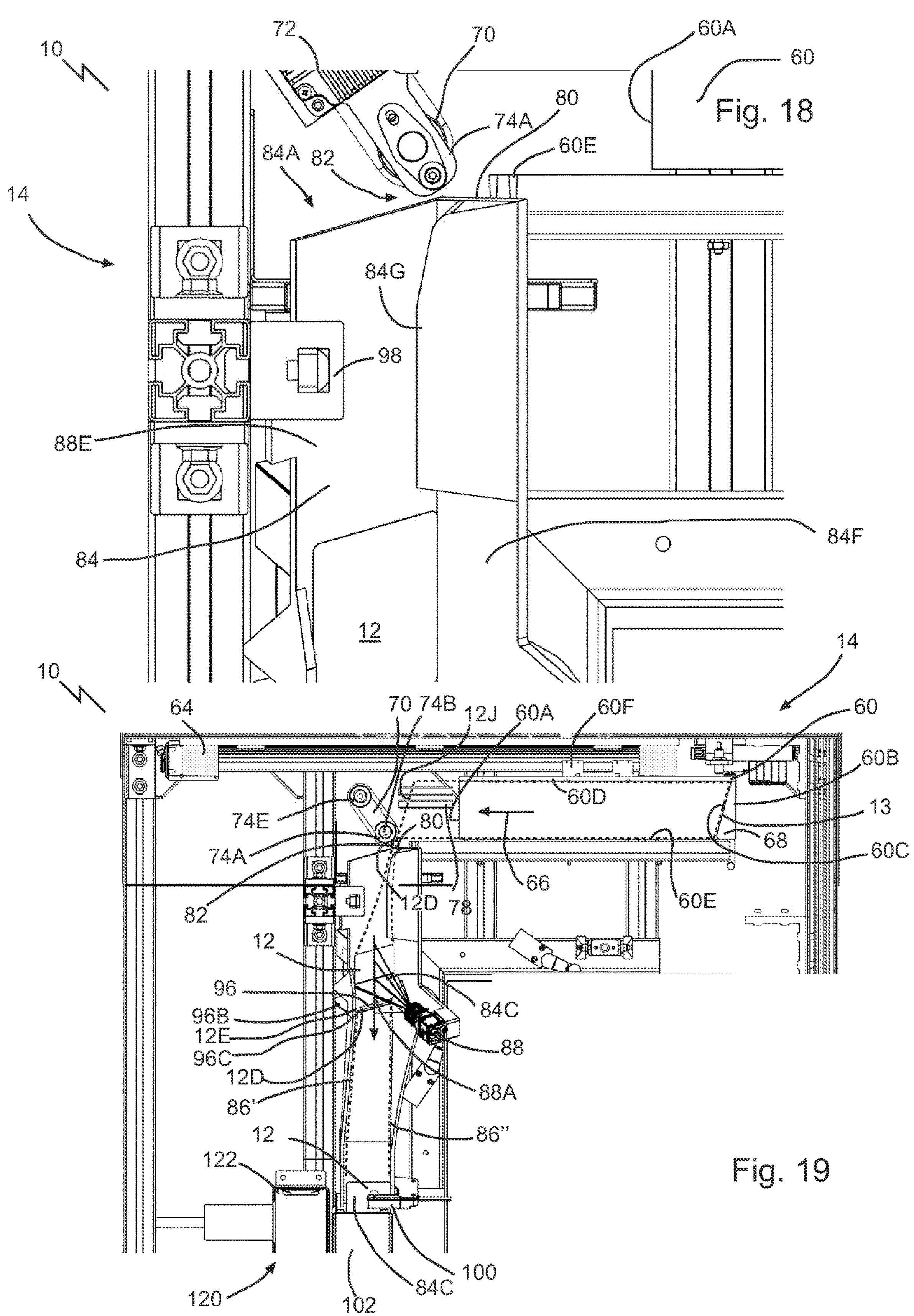
FIG. 18 is a close-up top plan view of the combination of FIG. 10 illustrating the singulator in more detail.
FIG. 19 is a top plan view of the trading card inventory management system of FIG. 3 with various parts, including the gantry and singulator actuator, removed at least in part, and with a path of trading cards through the card receiver, card chute, and card identifier illustrated in dashed lines.

Referring to FIG. 19, the singulator 70 may comprise, and the roller 74A may cooperate with, a lateral guide wall 80 spaced adjacent the roller 74A to define a card slot 82 therebetween. The guide wall 80 may be defined by a part of the card chute 84, such as card guide bumper shoulder 84G of chute 84, discussed further below. The guide wall 80 may be spaced out of the path of the cards 12 during advancement, such that the roller 74A contacts each leading card 12 at a position where an end travel axis 12J defined by a leading edge 12D of the leading card 12 aligns with slot 82, so that the roller 74A grips and translates the leading card 12 along the travel axis 12J through the slot 82. A leading edge of the trading card 12 is thus oriented toward the card slot 82.

Referring to FIGS. 2-8 and 10-27, the card identifier 16 may have a chute 84 for receiving cards 12 from the singulator 70. The chute 84 may be structured to feed trading cards 12, one at a time from the card receiver 14, for example tray 60, to a card imaging area 84C defined by the card identifier 16. The chute 84 may define a card input end 84A, and a card output end 84B. The chute 84 may have suitable walls, such as a card-face-contacting guide wall 84E, and a card-edge-contacting guide wall 84F. In the example shown, walls 84E and 84F are planar, for example defining a V-shaped cross-section (FIG. 21), for example at the card-imaging area 84C defined by chute 84.

Referring to FIGS. 13 and 19, the chute 84 may be structured to define a card path that twists the trading card

12 along the card path. In the example shown, the card path is illustrated by dashed lines 86' and 86" corresponding to the path of leading corners 12E of a card 12 that is fed into the chute 84. The chute 84 may be structured to twist the card as the card falls by gravity down the chute 84, from an upright position at the card input end 84A, to a face-up position at the card imaging area 84C. The face-up position refers to the card 12 with one of its faces resting on a base surface and the other face oriented upward, as opposed to an on-edge position where the card 12 rests on a base surface on its edge rather than on its face. The twisting of the card 12 may be carried out by passively guiding the card 12, such as not to actually bend the card 12, although in some cases a minor amount of bending may occur. The chute 84 may be structured such that along the card path the trading card moves from the upright position, with a leading top or bottom edge 12D of the trading card 12 entering the card input end 84A of the chute first. The card 12 may twist to the face-up position at the card staging area 84C, with the leading top or bottom edge 12D of the trading card 12 entering the card imaging area 84C first. By allowing the card 12 to twist from an upright position on its side edge 12C to a face-up position leading with a top or bottom edge 12D, the appropriate orientation of the card 12 may be achieved by the card 12 upon entering the imaging area 84C, ensuring that images of the card 12 are of the card 12 in the proper orientation. The chute 84 may incorporate one or more angled, tapered, and/or curved guide surfaces, such as a card bumper guide shoulder on the inside wall 80 of the chute 84, to prevent the card 12 from rotating (twisting) the wrong way in the chute 84. The chute 84 may define the card imaging area 84C by a portion of the chute 84 that is sloped downward, to ensure that the card 12 may move by gravity into and out of the area 84C when desired. The chute 84 may extend beyond the area 84C, for example extending to a run-out 84H where the card 12 may be fed into a staging area for translocator pickup or system discharge as desired.

Referring to FIGS. 1-3, 8, 10-19, 35A and 40, the system 10 watch for, monitor, and respond to, the passage of a card 12 from the singulator 70 to the card identifier 16. During use, a sensor (not shown, for example may be provided as part of feedback from a stepper motor 72) may send signals that are monitored to detect various events, such as malfunction, or in a step 260, to sense the passage or contact of a card 12 with roller 74A. Upon a card 12 being detected in step 262 as enter the chute 84, the system 10 may respond in a certain fashion. Card detection in the chute 84 or singulator 70 may be by a suitable mechanism, such as by detection by a proximity sensor 98, and/or by monitoring the feedback from motor 72 for changes in output corresponding to coming into contact and feeding a card 12.

Referring to FIGS. 10-19 and 35A-B, a feeder timer may be used to assist in the proper functioning of the singulator 70 and/or card identifier 16. The feeder timer (not shown) may be a process run by the computer 22, which may in all cases be one or more computers 22. The feeder timer may increment over time as the singulator 70 is running. If no card is detected in step 262, the system 10 may inquire whether the feeder timeout timer has started, in a step 262. The timeout timer may be a process run by computer 22 to determine if the singulator 70 has been running for an amount of time long enough to indicate a malfunction, such as a jammed card, or the end of a stack 13 of cards 12. If the timeout timer has not started, the system 10 may, in a step 206, begin the timeout timer, all the while continuing to run the feeder timer and/or operate the singulator 70. If the timeout timer has already started, the system may check in a step 268 whether the feed out timer is greater than the feeder timer cutoff. If no, the system may continue to advance the feeder motor 72 to advance the singulator 70. If yes, the system 10 may in a step 270 decide whether to end the session or not, in a step 270. If no, the system 10 may continue to advance the feeder motor 72, in a step 256. If yes, the system 10 may proceed to finalize card input step 208 to exit the process shown. In the case of a possible malfunction or jam, the system 10 may alert the user to check for a jam, while pausing or ending operation. In a step 274, on card detection, the system 10 may reset the feeder timer referred to above.

Referring to FIGS. 10-19, 35A-B and 40, if a card 12 is detected in step 262, as passing into the slide or chute 84, the system 10 may proceed to operate a card stopper 96. The card identifier 16 may comprise a retractable card stopper 96, for example oriented to selectively advance into and retract from the card path 86 adjacent the card imaging area 84C to retain and release a trading card 12 within and from card imaging area 84C during use. In a step 276, the system 10 may check whether the card slide stopper 96 is disabled, for example by the user selecting to disable the stopper using button 422 of user interface 47. If the stopper is disabled, the system 10 may continue to imaging steps discussed below. If the stopper is to be used, then the system 10 may in a step 278 engage the card slide stopper 96, by advancing the stopper 96 into the card path 86 to block the card 12 from leaving the card imaging area 84C. The card stopper 96 may have a suitable structure, such as an actuator 96A connected by bracket to the chute 84 or frame 28, which is connected to drive a plate 96B. In the example shown, the plate 96B is structured as a cam plate that is rotated to advance into and retract from (through a plate slot 96C in or downstream of the imaging area 84C) the path of the card 12 in chute 84. In other cases, a plate or other stopper may be actuated by a linear actuator into and out of the path 86. Upon engagement of the stopper 96, the system 10 may proceed to the next steps.

Figures 10, 11, 12:
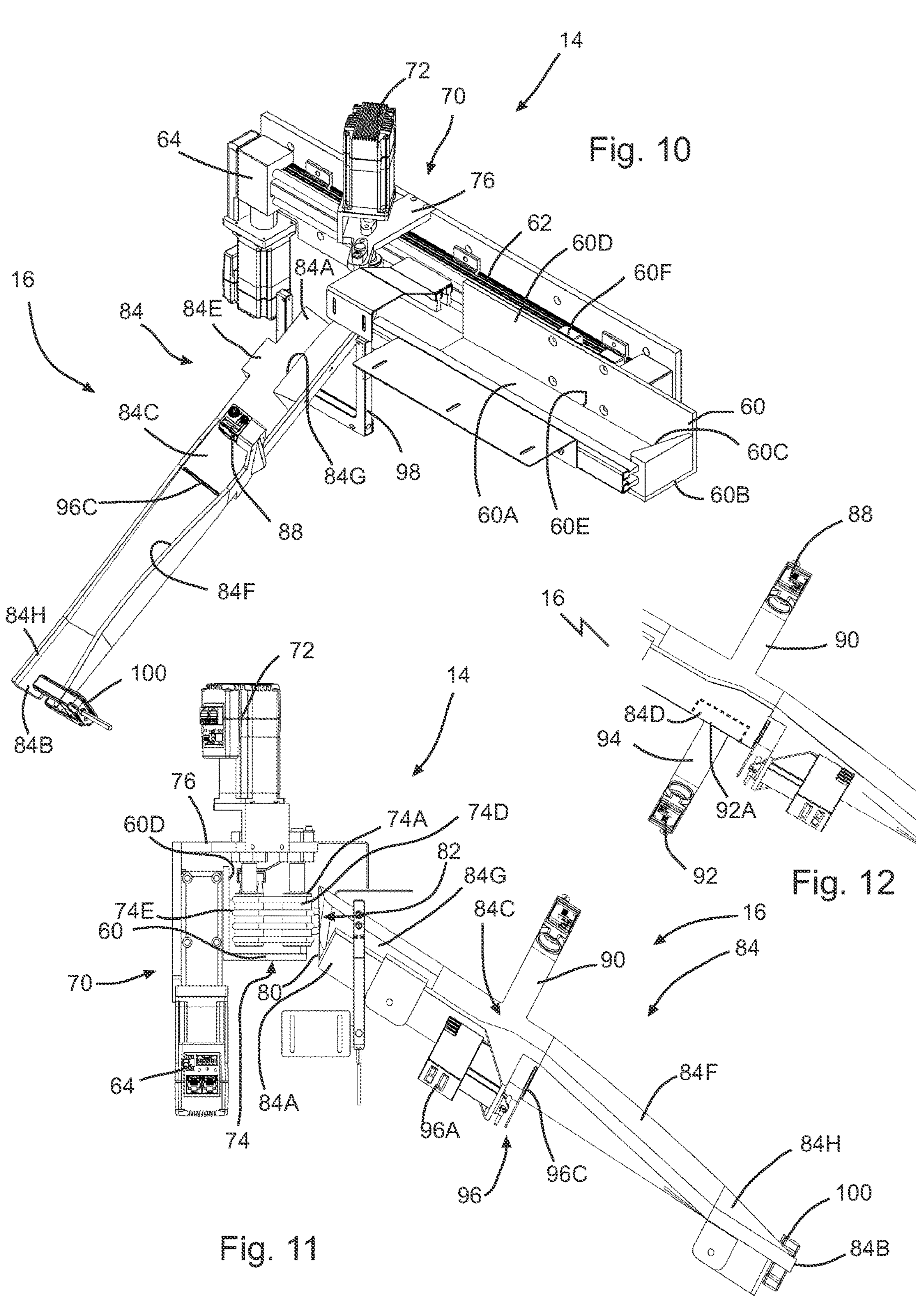
FIGS. 10 and 11 are front perspective and left side elevation views, respectively, of a card receiver, card chute, and card identifier combination from the trading card inventory management system of FIG. 3.
FIG. 12 is a side elevation view of a card imaging area of a card identifier chute illustrating a dual camera card identifier, as a variation of the single camera embodiment of FIG. 11.

Referring to FIGS. 11-13, 15, 19-20, and 35B, the system 10 may take images of the card 12 as it is positioned within the card identifier 16. The card identifier 16 may comprise one or more cameras 88 directed to capture images of a face 12A or 12B of a trading card 12 received in the card imaging area 84C. The computer 22 may be connected to receive the images and identify the trading card 12 from a database or other list of known trading cards 12. The camera 88 may be oriented overhead of the chute 84, for example positioned by a bracket 90 to be above the area 84C and looking down on the area 84C. Referring to FIG. 12, the one or more cameras may comprise plural cameras 88 and 92, for example in order to simultaneously or sequentially image the front and rear faces 12A and 12B of the card 12. The second camera 92 may be directed up toward the card imaging area 84C through a transparent surface or window 84D of the chute 84. The second camera 92 may be mounted to the frame 28 by a suitable mechanism, such as a bracket 94.

Referring to FIGS. 11-13, 15, 19-20, and 35B, the system 10 may follow a variety of protocols in conjunction with taking an image. In a step 280, the camera 88 may be used to detect movement in the chute 84. In a step fadeout 282, if no object is seen in the field of view 88A, the system 10 checks whether there is a time out timer miming, to verify whether there is something wrong in the chute 84. In a step 284, if not, then the system 10 may start a machine time out timer in a step 284. In a step 286, the system 10 may ask whether the time has exceeded the system 10 set limit of waiting to find an object. If the system 10 has exceeded the waiting point, the system 10 may conclude there is a problem on the chute 84 and may stop running singulation, terminating operation with a camera error, which may be reported to the user via display 46. Otherwise, if the time out has not reached the camera set time out, the system 10 may continue waiting to see whether an object enters the camera's field of view 88A, by repeating step 280.

Referring to FIGS. 11-13, 15, 19-20, and 35B-C, if information from the camera 88 indicates that an object has moved within the field of view 88A of the camera 88, the system 10 may carry out various checks and steps. The system 10 may reset the current count of photos that the user is willing to attempt to use for processing, in a step 292. The system 10 may take a photo or image of the object, in a step 292. In a step 294, system 10 may inquire whether it is possible to apply image processing to the object, to check whether the object detected is a card 12. More information on such process is described further below.

Referring to FIGS. 11-13, 15, 19-20, and 35B-D, if the system 10 is unable to process the image, or unable to identify a card 12, then the system 10 may run various sub-routines. In a step 296, the system 10 may increment the total photos taken as to decide if it should continue or abandon trying to determine whether there is an object in the chute 84 for the present detected motion. In a step 298, the system 10 may check to see if it has reached the system set limit of attempted photos. If the limit is not yet reached, the system 10 may go back to step 292 and acquire another image. If the limit has been reached, then in a step 300, the system 10 may check whether the system 10 is using the card stopper 96. If yes, then in a step 302 the system 10 may disengage the stopper 96 to remove the object from the chute 84.

Figures 9A, 9B:
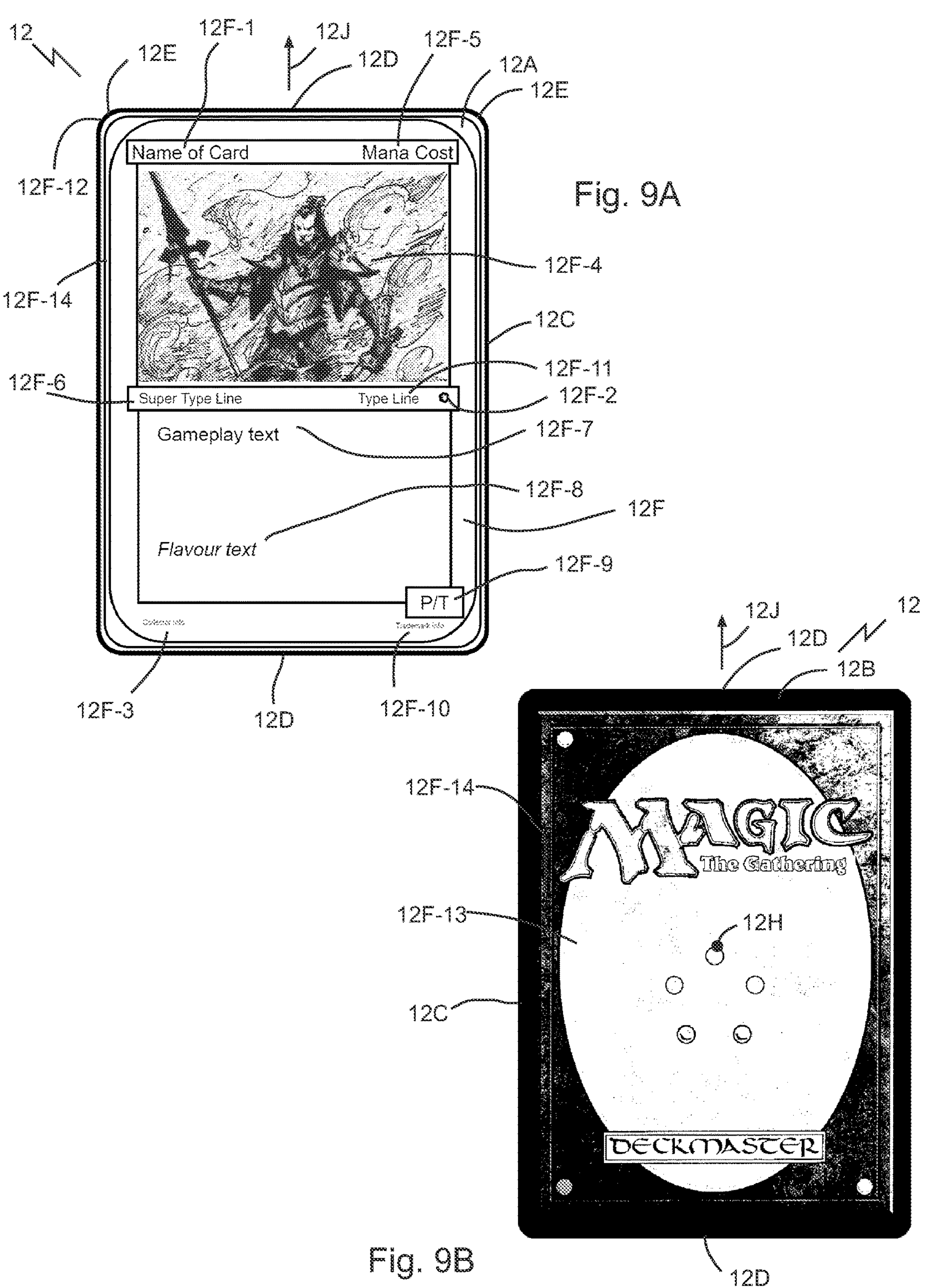
FIGS. 9A and 9B are front and rear face views of an example trading card for the well-known game, Magic the Gathering™.

Referring to FIGS. 9A-9B, an example trading card 12 is depicted displaying the characteristics of a popular trading card game card 12 from Magic the Gathering™. The trading card system 10 may properly identify a respective game for which the trading card 12 may apply, and may store such information in association with each card 12, to differentiate from cards 12 of different games.

Referring to FIGS. 9A-B and 19, various steps may be taken to determine the card's identity. System 10 may acquire a photo of cards 12 passing through or positioned on the chute 84 in the card imaging area 84C. Images of the card 12, for example images of the front face 12A and in some cases images of the rear face 12B, may be sent by digital form to the computer 22 for analysis. System 10 may use the computer 22, for example processor 42, to apply an object detection algorithm on such images. An exemplary object detection algorithm may run a comparison of pixels between images taken of card 12 in contrast to a control image taken of the area 84C without objects in the image. Upon the identification of discrepancies between the images being above a particular threshold of discrepancies, and the assessment of such discrepancies forming the boundary shape of a card 12, a computer 22 may overlay a bounding box around the sum area of different pixels within the photo and mark it as an object, which should equate in a standard scenario to the area bounded by the peripheral edges 12C and 12D of the card 12.

Figures 20, 21:
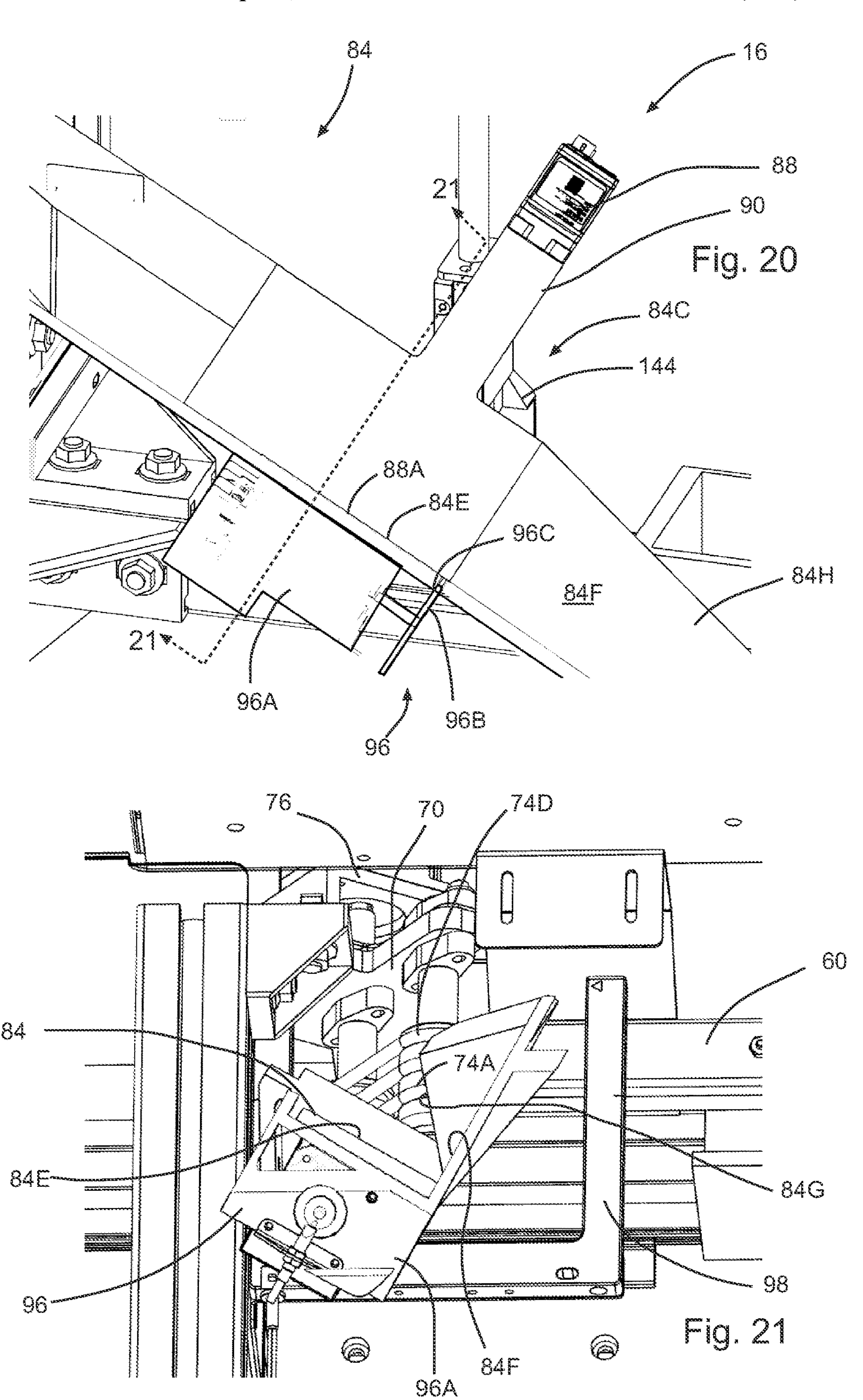
FIG. 20 is a cross-sectional view taken along the 20-20 section lines of FIG. 13.
FIG. 21 is a cross-sectional view taken along the 21-21 section lines of FIG. 20.

Referring to FIGS. 9A-B and 19, if an acceptable object is found and identified as having the basic dimensions and shape of a card 12, the system 10 may perform additional steps. Referring to FIGS. 19-20, the system 10 may engage a card stopper 96 on the chute 84 to have additional time processing of the object in the field of view 88A. As above, the stopper 96 may be engaged in some cases only when the user has initially selected that the stopper 96 is used. With a stationary object (card 12) in the field of view 88A, the camera 88 may take additional image(s) of the card 12, and/or may take higher quality image(s) of the card 12 than were initially taken while the card 12 was entering and moving in the field of view 88A.

Referring to FIGS. 9A-9B and 19, the computer 22 may carry out steps to identify and analyze the card 12. The computer 22 may perform an edge detection algorithm on the object to determine the object size. An example of object detection is determining a line of pixels within the bounding box of an object pre-determined to be a certain length. Once a line is found that computer 22 may overlay another line outlining the detected edges 12C and 12D. Once two edges 12C and 12D perpendicular to one another are found, the computer 22 may determine the area of the edges and compare them to a pre-determined size of a trading card 12 within the same position in the chute 84. If the areas are within similar size ranges, the computer 22 may proceed to performing additional analyses as described below.

Referring to FIGS. 9A and 9B, the computer 22 may attempt to detect whether the image is that of the front or rear face 12A/12B. The rear face 12B may be identified by suitable means, such as by overlaying the "Magic" image common to Magic: The Gathering™ cards, and doing a pixel comparison for similarity. If identified as the rear face 12B, the system 10 may end further processing of the image. The system 10 may display the image of the rear face 12B for the user in the display 46, and may indicate to the user that the rear face 12B was detected. If the system 10 does not identify the image as displaying the rear face 12B, further analyses may be carried out.

Referring to FIG. 9A, the system 10 may carry out further processing to determine whether the image is that of the front face 12A. The system may overlay a template of a plurality of detection regions to the identified object and perform specific analyses on each region. As an example, the computer 22 may overlay an area where a card title 12F-1 is expected to be located and perform a text analysis algorithm such as OCR (Optical Character Recognition) to determine the title of the card. If a string is not found in the text field area, the image area contained within the detected edges may be rotated 180 degrees and the computer 22 may then re-apply the OCR algorithm to check for the title 12F-1 to ensure whether the orientation of the object is correct. If the computer 22 still fails to detect a title 12F-1 the image may be rejected, and/or the card 12 may be ejected by the system 10, as described in a later process, or further processing may be carried out to see whether the image is that of the rear face 12B of the card 12 (FIG. 9B). Various regions of the card 12 face 12A may be analyzed, such as one or more of the title 12F-1, the set symbol 12F-2, the collector information 12F-3, the artwork 12F-4, the mana cost 12F-5, the super type line 12F-6, the gameplay text 12F-7, the flavor text 12F-8, the power and toughness text 12F-9, the trademark information 12F-10, the type line 12F-11, and the card border frame 12F-14. In some cases, physical features such as the corner 12F-12 style, and/or edge dimensions, may be reviewed and/or stored.

Referring to FIG. 9A, upon detection of text in a templated region of the image, further processing may be carried out to identify the card 12. When a text string is found by the computer 22, for example in the title 12F-1 region, the system 10 may compare the text string against a list of strings for other known cards 12, for example stored in a database 44A of known cards 12 (FIG. 1) or a third-party card database 48A on a network 48 (FIG. 1). In the case of the title 12F-1, the text string may be compared with the card titles within a card database to determine if the found text string matches that of a known trading card name. The system 10 may be configured to use the card stopper 96 so that the system 10 may do further analysis, and or further imaging of, the detected object, otherwise the system 10 may proceed to eject the card 12 from the system 10 as described below later. Magic the Gathering™ trading cards 12 contain specific information on the front face (12A) of the card 12 that can specifically identify the card 12 out of the large quantity of possibilities (known cards 12) that exist. How the system 10 may identify a card is largely defined by the available information acquired from an image taken by a camera 88, and the algorithms a computer 22 applies to said image.

As an example of the above, a system 10 may be configured to either process the exact identification of a trading card 12 from the image it acquires immediately, or may queue the analysis for later, after some time has elapsed, to speed up initial throughput from the card tray 60. Were the system 10 configured to process the card upon initial identification in an image, analysis may proceed in a suitable fashion. Bounding boxes may be drawn in relation to an initial bounding box where OCR to acquire the card title 12F1-1 was performed. A bounding box may be drawn around the set symbol 12F-2, where the computer can then apply an image comparison analysis between the set symbol 12F-2 scanned, and a list set symbol images stored within a card database 44A to determine if a match is found. Another bounding box drawn may be drawn around the copyright information 12F-10, where an OCR system like that of the card title 12F-1 identification can be applied to determine contents of the copyright information as a string. Other regions may be bounded and reviewed for identification and classification. In some cases, the system 10 uses pixel and OCR comparison to infer a card condition, which is then stored and associated with the card 12. To process later, the image of the card 12 used to determine the title may be stored into an earlier configured data location which may then have the same bounding boxes applied with similar or even further analysis such as card 12 condition at a later period. Referring to FIG. 19, the system 10 may reject the object by disengaging the card stopper 96 and moving the card guide input end 102A to eject the card into a discharge chute 138. A down chute card 12 sensor 100 may be used by system 10 to verify the exit of an object from the chute 84.

The system 10 may store various types of information regarding each card 12. For example, various characteristics may be stored/displayed, such as any one or more of a title 12F-1 (name), set 12F-2, condition, collector information or number (CN), value, and premium features (foiling). The title of a card relates to the name conveyed for all the relevant information contained on a trading card 12. To ensure uniqueness between similar titles, cards are released in sets commonly abbreviated with a set code, for example a three- or four-letter abbreviation, representing the full name of the set. Due to alternative art, themes, or other details being changed between cards 12, a collector number, or brief stamp of information may be applied to a card 12 to specify the exact contents printed on the card denoting information such as alternative/extended art, language, special promotion, and/or specific printing date. External to the cards 12 printed features as sold, the condition or wear of the card 12 commonly effects the valuation of a trading card 12 and will be noted separately of the card 12 as mint, played, damaged, or various other concise descriptions of the state of the card as compared to its factory printed state. Additionally, cards 12 are occasionally modified in other manners, such as having a unique foil layer applied across the whole/parts of the card 12 front face to add premium qualities to a card for added value and exclusivity.

Figures 24, 25, 26:
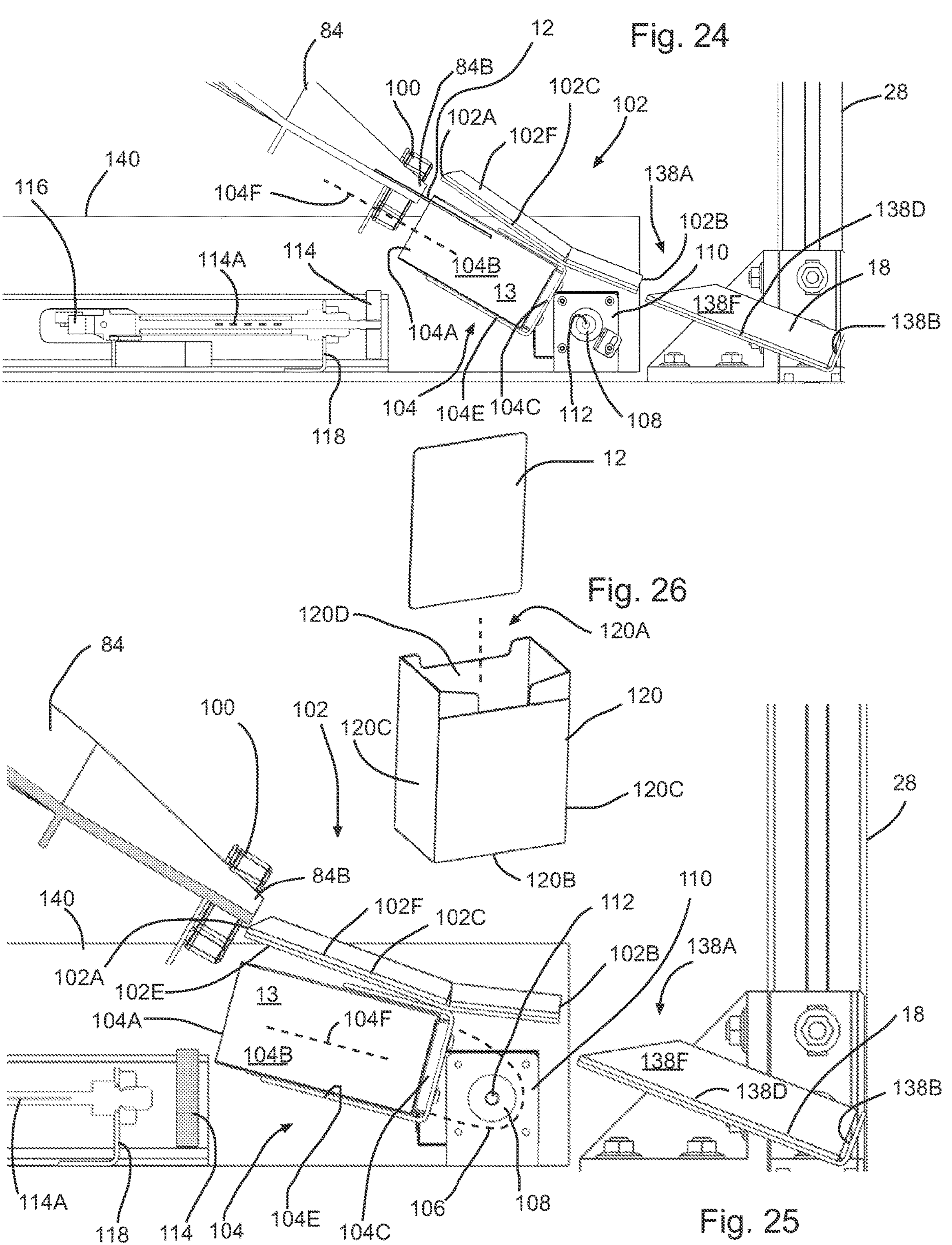
FIG. 24 is a cross-sectional view taken along the 24-24 section lines of FIG. 8, with a card box loaded in the card catcher, and the card guide moved into a card receiving position.
FIG. 25 is a cross-sectional view taken along the 25-25 section lines of FIG. 8, with the card guide moved into a card discharging position.
FIG. 26 is an exploded perspective view of an exemplary card box and card combination for use in the system of FIG. 2.

Referring to FIGS. 8, 22-25, and 27, the system 10 may comprise a card guide 102 for receiving and processing cards 12 and other objects from the chute 84. The chute 84 may be structured to feed trading cards 12 to a card guide 102. The card guide 102 may define a card input end 102A, and a card output end 102B. The guide 102 may define a card guide chute 102C, for example with side walls 102F. The chute 102C may be structured to direct the trading card 12 by gravity to the card discharge 18. The card guide 102 may be connected to selectively move between one or more of a card-receiving position (FIG. 24) and a card-discharging position (FIG. 25). In the card-receiving position, the card guide 102 may direct the trading card 12 into card storage 20, for example into a card catcher 104, which may be mounted to a bottom surface 102E of the card chute 102C. In the card-discharging position, the card guide 102 may direct the trading card 12 to the card discharge 18.

Referring to FIGS. 8, 22-25, and 27, the card catcher 104 may have suitable features. The card catcher 104 may define a card input end 104A, and a card box receptacle 104B. In the example shown, the receptacle 104B may define a rear receptacle end 104C, side walls 104D, and a base wall 104E. The receptacle 104B may define a card box or card insertion axis 104F, along which card boxes 120 and/or cards 12 may be inserted into the card catcher 104. The card catcher 104 may be positioned to receive cards 12 travelling by gravity down chute 84, when the card guide 102 is in the correct position, for example in the card-receiving position (FIG. 24).

Referring to FIGS. 8 and 22-27, the system 10 may be structured to receive and store cards 12 within a card stack box 120. A card box 120 may be a container structured to hold a plurality of cards, for example between twenty and one hundred twenty cards, for further example between eighty and one hundred cards. A card box 120 may define an opening for receiving cards 12, such as an open top 120A. The box 120 may define a base 120B, side walls 120C, and a card-receiving receptacle or interior 120D. In the example shown, the card box 120 may be formed from a blank of rigid paper bent into an open box shape. Other forms of card box 120 may be used, include molded, plastic, metallic, and other forms. Each box 120 may be provided with a lid or access gate, a locking part, hooking parts, or other suitable features. Each card 12 may have side edges 12C that are relatively longer than its top and bottom edges 12D. The card box 120 may be shaped to receive cards 12 with top and/or bottom edges 12D resting on base 120B and side edges 12C and faces 12A/12B adjacent side walls 120C. The card guide 102 may be structured to orient card boxes 120 to collect cards 12 from chute 84. The card catcher 104 may orient the boxes 120 so that the open end (top 120A) is oriented to receive trading cards 12 from the chute 84 when the card guide 102 is in the card-receiving position (FIG. 24).

Referring to FIGS. 3, 8, 22-25, and 27, the card guide 102 may be structured to move between positions by a suitable mechanism. The card guide 102 may be mounted to frame 28 by a swing arm 106 or other lever. An actuator 108 may be connected to actuate motion of the guide 102, for example by rotating about a catcher pivot axis 112. Actuator 108 may be mounted to frame 28 by a suitable mechanism such as a bracket 110. In other cases, other forms of movement of guide 102 may be facilitated, such as translating, swinging, sliding, compound motions, and others.

Referring to FIGS. 2, 8, 22-25, and 27, the system 10 may load card boxes 120 into the card guide 102 by a suitable mechanism. A card stack box supply, for example having a card box stack tower frame 122, may be supplied that is structured to retain and supply a stack 124 of card stack boxes 120 to the card guide 102. The frame 122 may be structured to retain a plurality of empty card stack boxes. The frame 122 may be structured to supply the card stack boxes 120 one at a time into the card catcher 104. The frame 122 may define an open top end 122A, a base end 122B, side walls 122C, a rear wall 122D, and a front wall 122E. One or more walls, such as front wall 122E may be slotted for various purposes. One or more sensor apertures 122F may be defined in the frame 122, for example at suitable locations such as the first and third row of boxes 120 in the frame 122. Card box sensors 134 may be positioned by a mounting bracket 136 to sense for the presence of boxes 120 in the positions aligned with apertures 122F. The frame 122 may have a suitable card box input, such as open top end 122A. The frame 122 may have a suitable card box outlet, such as a card box slot 122G in the rear wall 122D. The frame 122 may form a guide shaft 122H or chute for receiving and supplying card boxes 120.

Figures 22, 23:
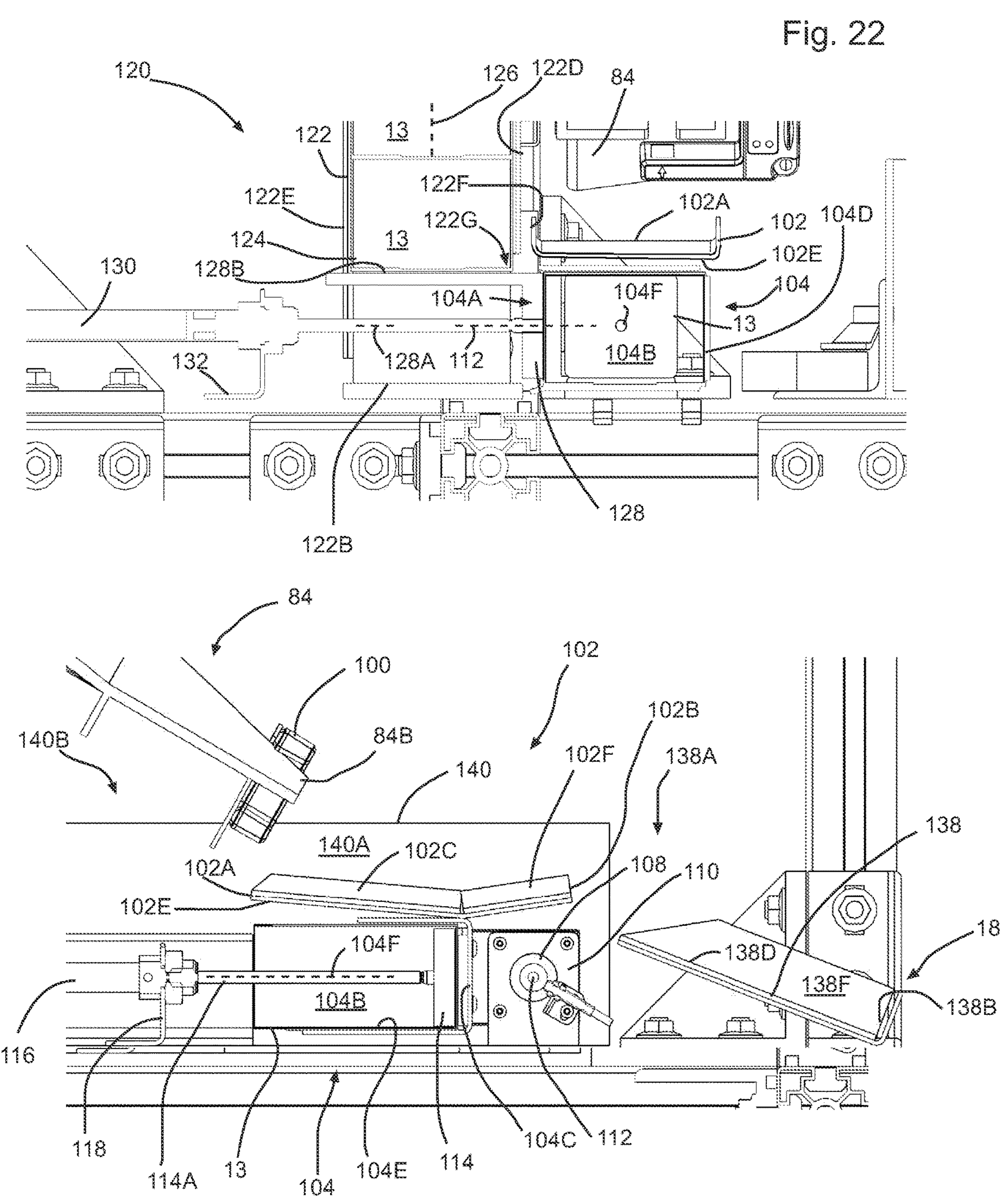
FIG. 22 is a cross-sectional view taken along the 22-22 section lines of FIG. 8, with an actuator advancing an empty card stack box from a card stack box supply into a card catcher.
FIG. 23 is a cross-sectional view taken along the 23-23 section lines of FIG. 13, with a card catcher in a card stack box reloading position to locate a card box within the card catcher.

Referring to FIGS. 2, 8, 22-25, and 27, the card box supply may be structured to supply card boxes 120 to the card guide 102 in a suitable fashion, for example one box 120 at a time. A card box positioning plunger 128 may advance laterally along a card box insertion axis 128A to push a card box 120, positioned in the base position (lowest position) in frame 122, rearward out of the frame 122 through slot 122G (FIG. 22). Plunger 128 may define a card box support top plate 128B positioned flush or below a top plane defined by the card box 120 that is being moved out of frame 122, to support the boxes 120 above the box 120 that is being pushed out. Once the box 120 is off-loaded from frame 122, the plunger 128 may retract to its neutral position, allowing a card box from above to fall by gravity down a card box stack axis 126 into the primary (base) position in the tower frame 122 for loading as the next box 120. An actuator 130 may drive the plunger 128, and may be mounted to frame 28 in a suitable fashion such as via a mounting bracket 132. The plunger 128 may move a box 120 laterally out of frame 122 and into the path (insertion axis 114A) of a catcher box positioning plunger 114. Once in position, the plunger 114 may advance along insertion axis 114A to contact rear wall 122D of a box 120 and translate the box 120 along axis 114A into receptacle 104B of card catcher 104 (FIG. 23). Plunger 114 may be driven by an actuator 116, for example mounted by a bracket 118 to frame 28. In order to load an empty box 120 from frame 122 into catcher 104, the card guide 102 may be moved into a card box receiving position (FIG. 23). Once box 120 is received by catcher 104, the plunger 114 may retract to its neutral position.

Referring to FIGS. 22-25, 27, and 35C, as further described above, in a step 304, a card guide 102 may be placed into a card discharge position (FIG. 25) so the object goes into a discharge chute 102C. In a step 306 the object exits the plunger chute 102C. Discharge 18 may have a suitable structure, for example a discharge chute 138 may be provided at discharge 18 to receive cards 12. Chute 138 may define a card input end 138A, a card output end/stop wall 138B, a top slide surface 138D, and side walls 138F. Referring to FIG. 1, the chute 138 may be accessible from outside the housing 26 by opening an access door 26F or via a discharge opening. Referring to FIGS. 22-25, 27, and 35C-D, in a step 308 the system 10 may increment the count of objects in the discharge 18, for example to monitor and ensure the discharge 18 does not overflow. The system 10 may inquire in a step 310 whether the machine is going to overflow if it puts any more objects in discharge chute. If no, the system 10 may proceed to feed the next card 12 in step 256. If no, the system 10 may prompt the user to clear out the tray in step 312, and thereafter in a step 314 may subsequently reset the discharge tray count to 0 once the tray is confirmed empty.

Referring to FIGS. 20, 22-25, 27, and 35C-D, if the system 10 is able to process the card 12 in step 294, various further steps may be carried out. The system 10 may, in a step 316, inquire whether the card stopper 96 is disabled, and if not, the system 10 may in a step 318 disengage the stopper 96 to let the object fall down the chute. Otherwise, if the stopper 96 is already disable, the system 10 ignores this step since it is irrelevant. The system 10 may then in a step 320 perform a level of processing on the acquired card image dictated by whether the card stopper is enabled, or in some cases a fast scan approach if selected by the user, for example for identifying but not storing cards 12. Processing may be performed to an extent sufficient to validate the end location of the trading card 12. In a step 322 the system 10 may check whether the card 12 is to be ejected, and if yes, in a step 324 as previously described may adjust the card guide to an output chute position (FIG. 25).

Referring to FIGS. 20, 22-25, 27, and 35C-D, if desired, cards 12 may be received in boxes 120 for storage by a suitable method. In a step 326 the system 10 may check to ensure the output chute (guide 102) is positioned correctly to accept a card 12 into the deck box 120 located within the card catcher. In a step 328, if the machine is not in the correct position, it may adjust accordingly to catch the card 12 based off its current count of cards 12 within the card catcher 104. The card catcher 104 may gradually lower per card 12 inputted to ensure cards 12 properly enter the card catching receptacle 104B without jamming. IN a step 330, the system 10 may use a sensor (such as sensor 100) to detect whether a card 12 has exited the slide (chute 84) and into the card guide/card catcher 104 accordingly. If there is no chute 84 exit detected at this step within a timer similar to that of the image timer timeout system, a machine error may occur based on the assumption a jam has occurred within the chute.

Referring to FIGS. 20, 22-25, 27, and 35C-D, the system 10 may perform various steps once cards 12 are loaded in box 120. In a step 332, once a card 12 is received in box 120, the system 10 may increment the total cards stored in the deck box 120 as to note the current total inventory held within it, using the value as its storage index within the specific deck box 120 for inventory purposes. In a step 334, system 10 may check to ensure the limit of card storage per deck box 120 has not been exceeded. If so, a subroutine may be executed (described below), otherwise the system 10 may return to singulating a new card from the feeder tray in step 256.

Referring to FIGS. 2-8 and 27, the system 10 may comprise a suitable card translocator 24. The card translocator 24 may comprise a crane 142. The crane 142 may comprise a suitable mechanism for retrieving cards 12 or boxes 120, such as a claw 144. The claw 144 may be structured to grip a trading card 12 or a card stack box 120 containing a plurality of trading cards 12.

Figures 4, 4A, 5:
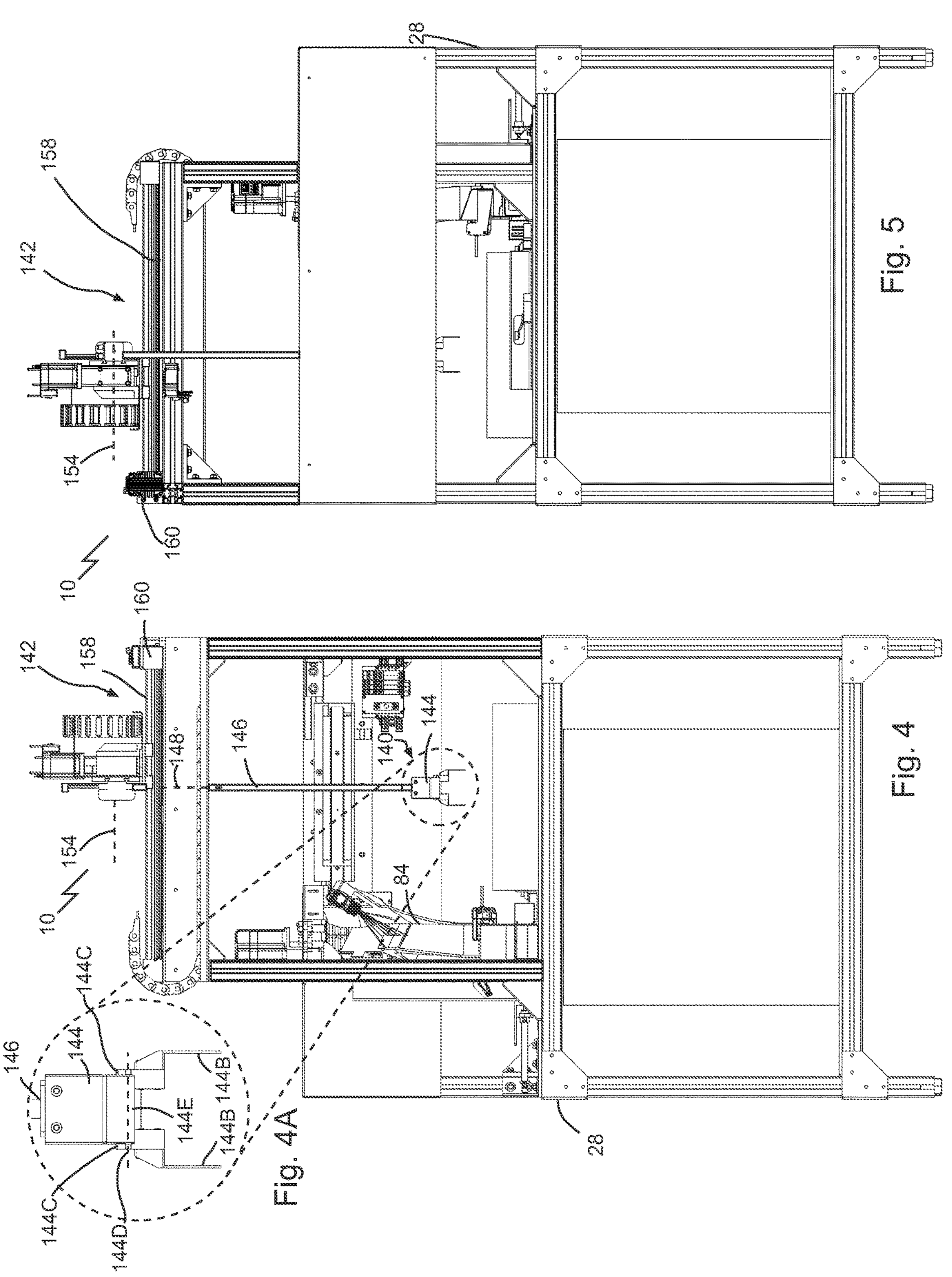
FIGS. 4-7 are front, rear, left, and right, respectively, side elevation views of the trading card inventory management system of FIG. 3.
FIG. 4A is a close-up view of the section denoted by dashed lines in FIG. 4.
Figures 6, 7:
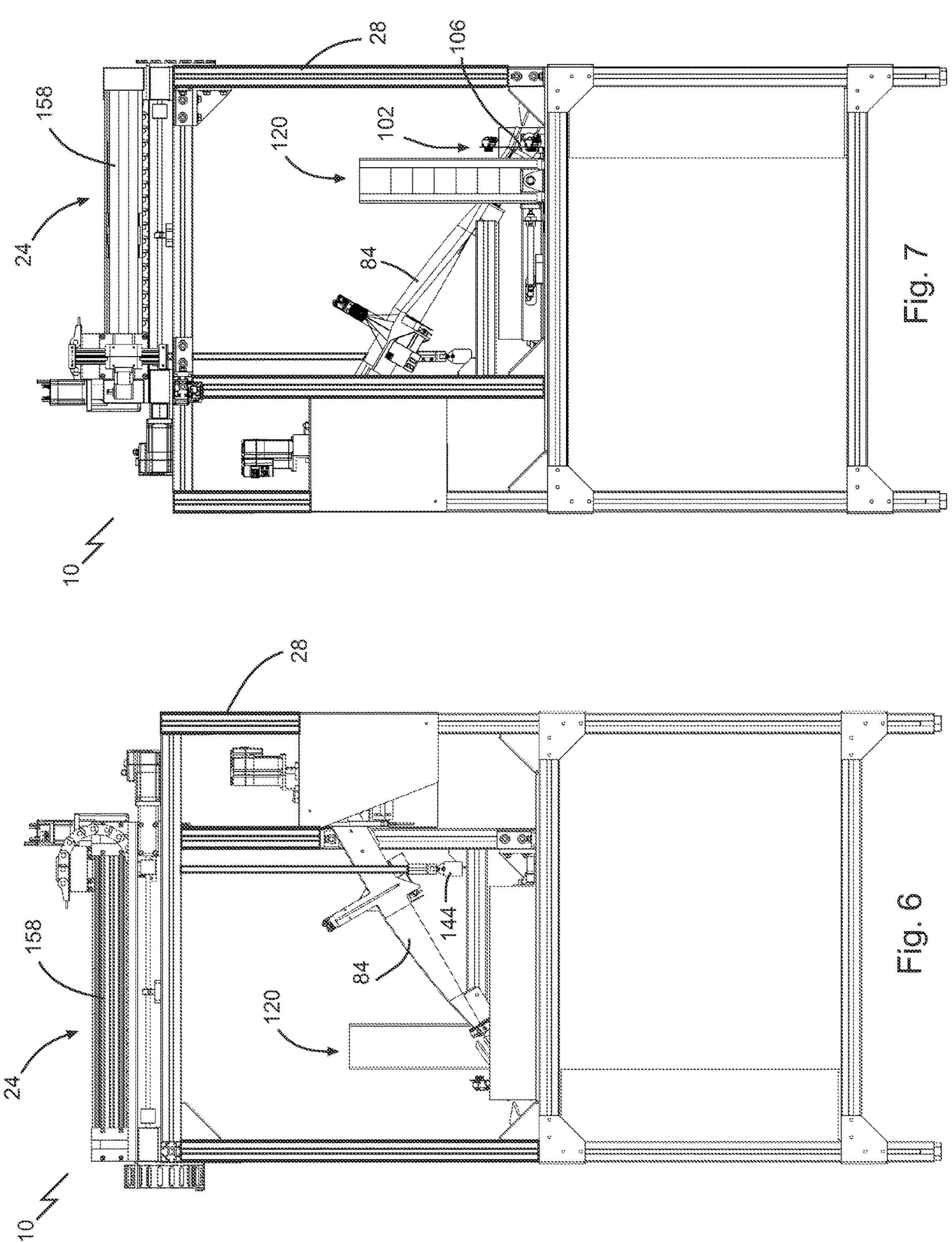

Referring to FIGS. 4 and 27, the claw 144 may have a suitable structure for gripping cards 12 or boxes 120, such as a head 144A with opposed jaws 144B. Jaws 144B may be mounted to move relative to one another to converge and diverge to retain and release, respectively, a card 12 or box 120. Jaws 144 may move by a suitable mechanism, such as by translation of shaft receivers 144E along an axis 144D defined along shafts 144C. The jaws 144B may be structured to grip the box 120 by a suitable method, such as gripping side walls 120C of each box 120.

Referring to FIGS. 2-8 and 27, the crane 142 may comprise a multi-axis gantry, such as shown. The gantry system may comprise a plurality of moving parts. A gantry bridge rail 150 may be mounted to opposed gantry bridge rails 158. First and second ends 150A, 150B of rail 150 may mount to rails 158, for example via bridge rail brackets 156. Bridge rail actuators 160 may cooperate to translate the bridge rail 150 back and forth in an orientation perpendicular to rails 158. In the example shown actuators 160 may use tread conveyors 164 to act upon bridge rail 150, although other actuators may be used, such as screw conveyors 166 (FIG. 32). A timing rod 162 may extend between actuators 160 to ensure alignment and synchronized function of actuators 160. Referring to FIGS. 2-8 and 27, the bridge rail 150 may translocate the claw 144 or other suitable card gripper by a suitable mechanism. The claw 144 may be mounted to a crane arm 146 that depends from a crane carrier 152 on rail 150. The crane arm 146 may have a suitable actuator 148 to raise and lower the arm 146 and hence the claw 144. The provision of three linear actuators oriented perpendicular to one another provides a tri-axis translocating system capable of accessing and moving parts in three dimensions throughout the interior of the housing 26 with freedom. Other translocating systems may be used.

Referring to FIGS. 2-8 and 27-28, the card storage 20 may have a suitable structure, such as a box housing 140, for example having walls 140A and a base 140C. The box housing 140 may have an open top for access from the top, although other systems of storage may be used such as providing lateral access to storage via shelving, or in layered storage systems. Bay walls 140D may be distributed about an interior of housing 140 to define card box rows 140F and bays 140E for individual card boxes 120. The housing 140 may in some cases be adapted for receiving individual cards 12. The card storage 20 may be structured to define plural card stack box bays 140E that are each assigned card stack box locations by the computer 22.

Referring to FIGS. 2-8, 27-28, and FIG. 35D, translocator 24 may be structured to move cards 12 or boxes 120 between the card guide 102 and the card storage 20. Assuming the inventory level has been surpassed, in a step 334, the machine may engage the card stopper 96 and otherwise halt singulation processing before returning to the beginning of the singulation process in step 256. Referring to FIG. 25, in a step 338, the card guide 102 may be moved, for example raised, into a card-pickup position to allow the deck box 120 full of trading cards 12 to be retrieved from the card catcher 104 by the card translocator 24. The card translocator 24 may be structured to collect and relocate, on commands from the computer 22, the card stack box 120 located within the card catcher 104, to the card storage 20, when the card catcher 104 is in the card-pickup position. In a step 340, the card translocator 24 may then move into position over the card catcher 104, lower the claw 144, and converge jaws 144B about side walls 120C of the deck box 120 to engage the deck box 120. The deck box 120 may then be lifted, moved, and finally lowered into its resting location within a specific predetermined bay 140E of storage 20, by the card translocation system. The translocator 24 may return to its specified home position until new instructions are received.

Referring to FIGS. 2, 22, 23 and 35D, the card guide 102 may be reset and reloaded after pickup. The guide 102 may be subsequently moved out of the card-pickup position into the card box receiving position to receive an empty card box 120. Upon the translocation system retrieving the deck box 120 from the storage device, in a step 342, the card guide 102 may be moved, for example lowered, to a position to allow, in a step 344, the card box reload system to replace the missing deck box 120 into the catcher. The card deck box plunger 128 may force a deck box 120 from the card box reload tower frame 122 into the card catcher 104, proceeded by the card box positioning plunger 114 ensuring the box 120 is properly squared within the card catching bay or receptacle 140B. Upon completion of the new deck box 120 being loaded into the card catcher 104, the card guide 102 tray may be re-positioned to receive cards 12.

Referring to FIGS. 2-8, 27-28, and FIG. 35D, the system 10 may thereafter resume processing of cards 12. In a step 346 the card chute stopper 96 may be disengaged to allow the process of card singulation and scanning to be resumed. In a step 348 the count of cards within the current deck box 120 may be reset to 0, and in a step 350 the deck box scanner (sensors 134) may check to ensure there is a deck box 120 to use for reloading upon filling of the current box. In a step 354, if a deck box 120 reloads are empty or below a threshold, for example two or one boxes remaining, the machine may prompt the user to refill the deck boxes 120 into the reloading hopper (frame 122). System 10 may await user input/sensor detection of boxes 120 before it will allow singulation to proceed beyond the current deck box 120 being loaded. In some cases, in a step 356, the total amount of deck boxes 120 loaded may be entered into the system 10 so that the system 10 may keep accurate track of deck boxes 120 available for reloading of deck boxes. In a step 357, if a deck box remains within the hopper, the total quantity of deck boxes 120 for use will be decremented.

Referring to FIG. 32, a further embodiment of a card inventory management system 10 is illustrated. The translocator 24 of system 10 shown may incorporate screw conveyors 166 instead of belt conveyors. In addition, the singulator 70 may incorporate a single contact roller 74A with no drive roller.

Referring to FIGS. 28-29, and 32, the computer 22 may be structured to send control signals to direct the card translocator 24 to move trading cards 12 from the card storage 20 to the card receiver 14. A card dispenser 168 may be mounted to frame 28 to dump cards 12 into the card receiver 14. The card translocator 24 may be structured to, upon command of the computer 22, locate and dispense the trading card 12 or trading cards stored within a selected card stack box 120 from the card storage 20 into the card receiver 14. One example of how to achieve such function is shown, although other suitable mechanisms may be used. The translocator 24 may locate and engage a specific predetermined card box 120 stored within either a particular bay 140E of storage housing 140, or within card catcher 104. The translocator 24 may thereafter carry the box 120 to a position adjacent and above the receiver 14. The translocator 24 may then dispense the contents of the card box 120 (or a card 12) into the receiver 14. In the example shown, the box 120 may be lowered onto a platform 170 adjacent card tray 60, with platform and box 120 in the position shown in dashed lines initially. The system 10 may then instruct the platform to rotate ninety degrees into the position shown in solid lines, about axis 174 via actuator 172. The platform 170 may incorporate parts to secure the box 120, for example magnets may be used to secure the box 120 on the platform 170. The platform 170 may thereafter dump the contents of box 120 into the tray in the proper orientation as shown, by rotating the platform 170 about a dumping axis 178 using actuator 176. The tray 60 may incorporate a mechanism to ensure proper positioning of cards 12 in tray 60, for example a card positioning plunger 180 may be advanced via actuator 182 to press the cards 12 against the shoulder 60C of tray 60. The platform 170 and box 120 may be reset, and the user may remove the box 120, or the translocator 24 may remove the box 120.

Referring to FIGS. 29-30, the translocator 24 may be structured to feed empty card boxes 120 back into the card stack box supply. The card stack box supply may comprise a card stack box input chute structured to receive the card stack boxes 120 in a stack 124 from the card translocator 24. One example of how to achieve such function is shown, although other suitable methods may be used. The box 120 may be carried by translocator (not shown in FIG. 30) to a tower reload hopper 123. The translocator 24 may overshoot the hopper 123 slightly, so as to bump the lower edge of the box 120 laterally against a loading ramp 123A of hopper 123, and tilt the box 120. The box 120 may then be released by the translocator 24, after which the box 120 rotates about arrows 125A onto its side, and thereafter slides along arrows 125B down loading ramp 123A to contact a reverse guide ramp 123B on a side of hopper 123 opposed to loading ramp 123A. Once in contact with ramp 123B, a top of the box 120 may rotate along a path defined by arrow 125C into a box guide 123C cutout of a guide shaft 122H of frame 122, to orient the box 120 into the proper configuration for thereafter falling down frame 122 into stack 124. In some cases, the system 10 may simply take partial or fully empty deck boxes 120 from storage 20 or tray 60, and deposit such boxes into the card catcher 104 when in the card-pickup position (FIG. 27).

Figure 36:
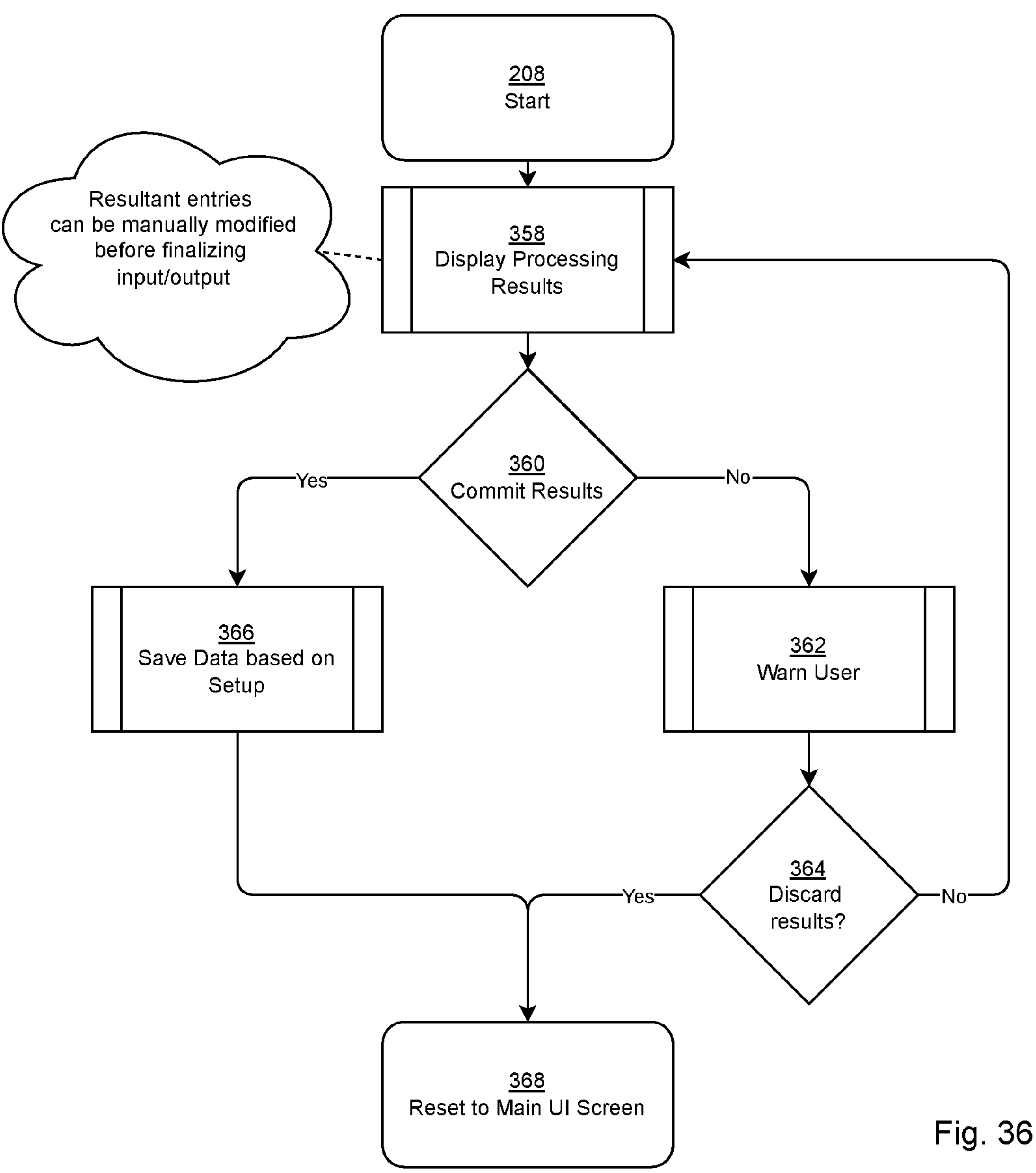
FIG. 36 is a flowchart of an example method of finalizing trading card input for use with a trading card inventory management system.

Referring to FIGS. 1, 40 and 36, a method of storing and displaying card 12 identification results is illustrated. The computer 22 may be structured to identify and store in a card storage inventory database 44B one or more identity characteristics of individual trading cards 12 identified at the card identifier 16. As above, example identity characteristics include card name, set, condition, CN, foil value, and quantity. The identity and identity characteristics of individual trading cards 12 may be outputted to a display, such as user interface 47. The system 10 may output and/or store such results, without any actual sorting, as cards 12 are simply stored in boxes 120 as they are received and processed. The computer 22 may be structured to output to the display 46 or a data storage device such as storage medium 44 a list of the identity and identity characteristics of trading cards processed or stored in the trading card inventory management system. An example method of such steps is as follows. In a step 208, the process may begin. In a step 358, processing results of cards 12, for example that have been singulated through the machine as above, may be displayed, for example in field 436 on user interface 47 of FIG. 40. There may be an opportunity to manually adjust or tailor such results. In a step 360, the user may be provided with an option to decide whether to commit such results to storage. If the user selects yes, the data may be saved based on set up parameters, in step 366. If the user selects no, the user may in a step 362 be warned that processing data is about to be deleted if the user is to proceed, and thereafter deleted in a step 364, if the user confirms the intention to delete the results. In a step 368 the system 10 may return to the main screen for more processing.

Figure 37:
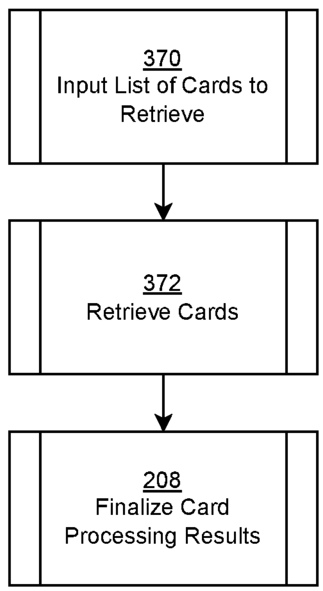
FIGS. 37-39 are flowcharts of aspects of an example method of retrieving trading cards from a trading card inventory management system.
Figure 38:
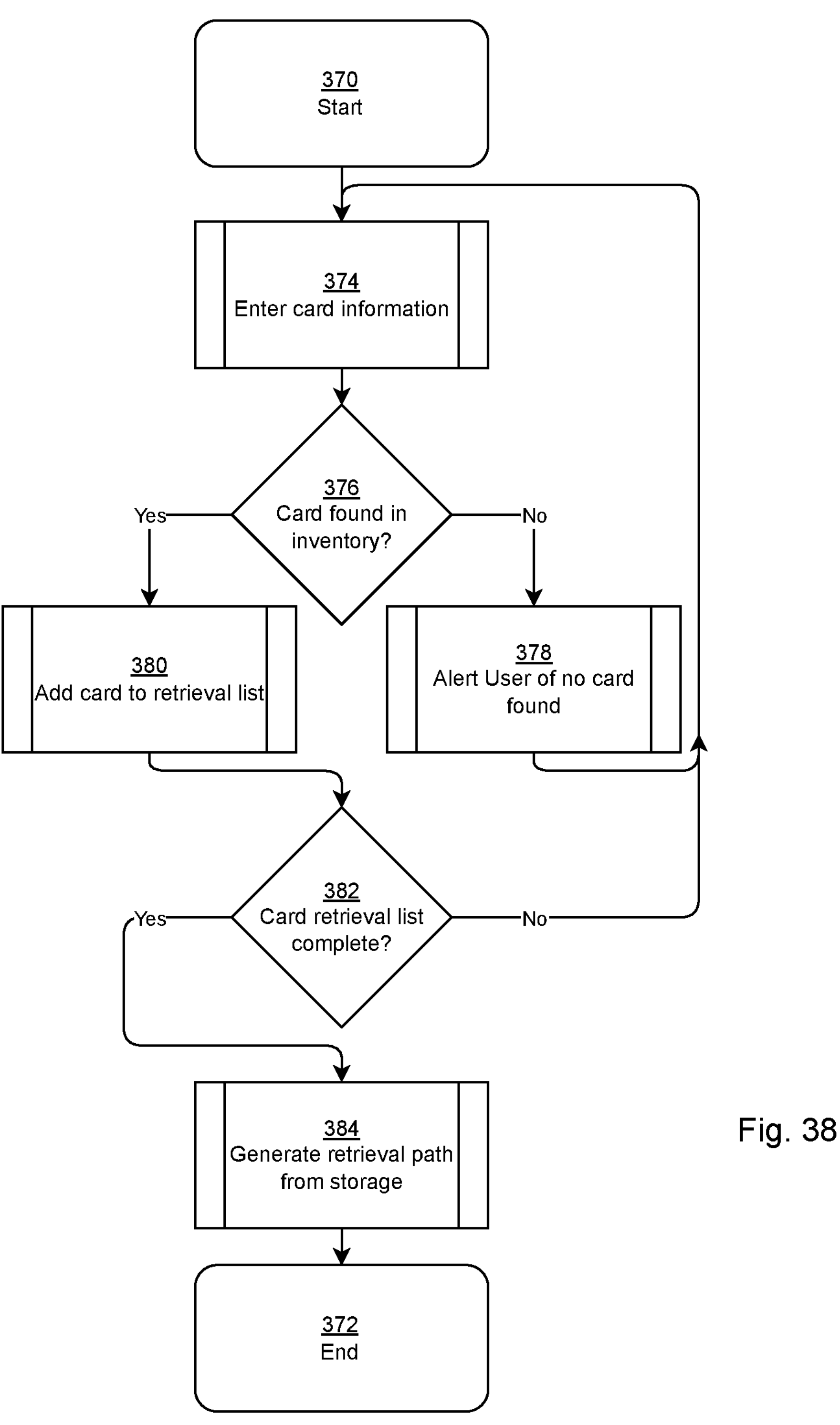
Figure 39:
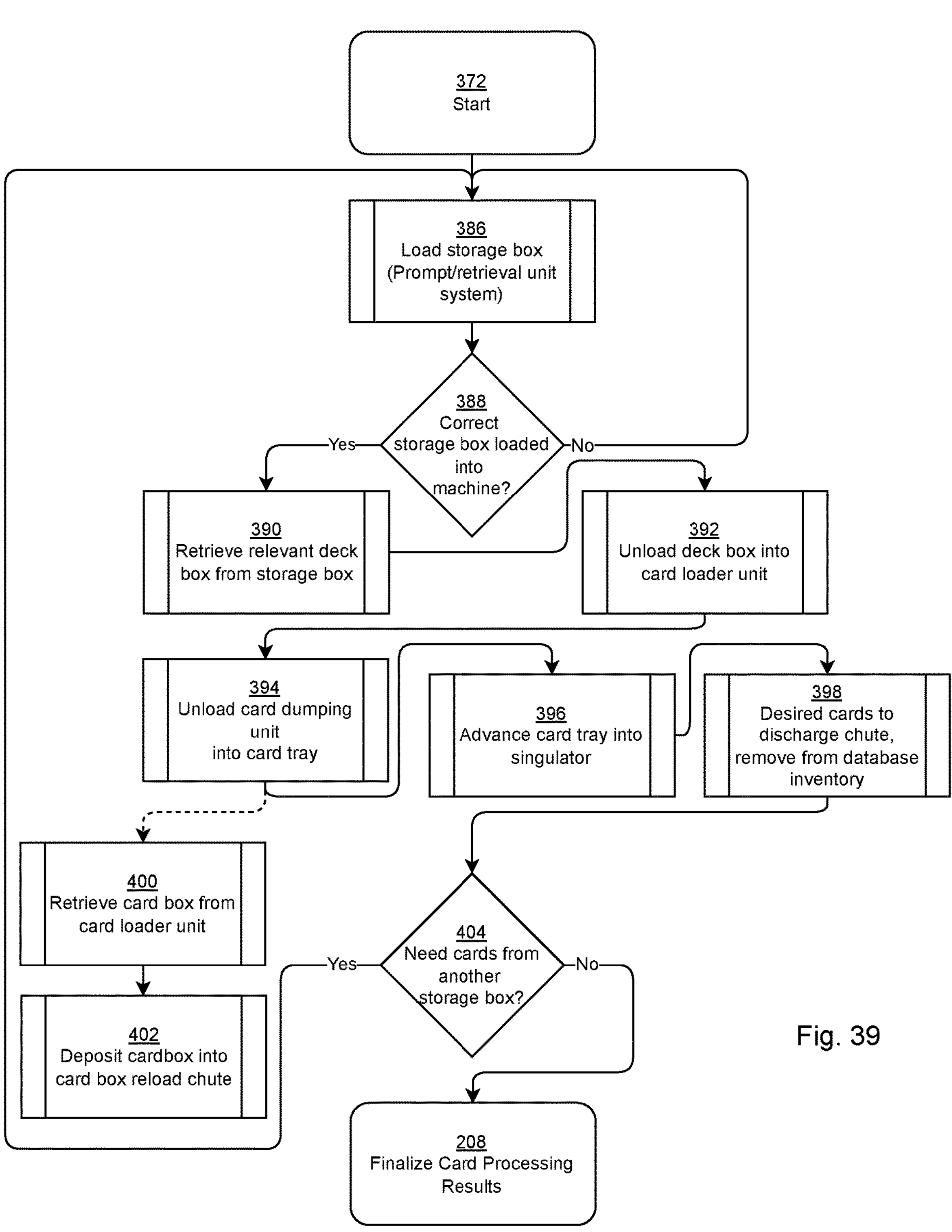

Referring to FIGS. 37-39, an example method is illustrated for retrieving cards 12 from storage 20. In a step 370, a user may input a list of cards 12 to retrieve. For example, in step 374, the user may enter desired card information, such as name, condition, and other variables. In a step 376, the system 10 may check the inventory database 44B to see which cards 12 are stored in inventory. If a card is found, the card 12 is added to a retrieval list that is being developed in the process. The retrieval list may be displayed, for example in a retrieval list field 432 on user interface 47 (FIG. 40). If a card is not found, the system 10 may alert the user, for example using display 46, that the card 12 was not found. In a step 382, the system 10 repeats the process until the card retrieval list is complete. In a step 384 the system 10 may generate a retrieval path from storage, for example a list of card boxes 120 to be dumped and re-processed as containing cards 12 for retrieval. In a step 372, the system 10 may retrieve such cards 12. For example, in a step 386 the user or system 10 may load a storage box housing 140 into the system, and in a step 388 the system may check whether the correct card box (housing 140) is loaded in the machine. If not, may proceed to step 404 or start over with a new box housing 140 if plural box housings are present. If the correct box housing 140 is loaded, the in a step 390, the system 10 may use translocator 24 to retrieve a relevant deck box 120 from storage 20, containing one or more cards 12 for retrieval. In steps 392 and 394, the box 120 may dump the contents of the box 120 in the tray 60 and unload the card dumping unit into the card tray 60. In a step 400, a dumped card box 120 that is empty may be retrieved, and in step 402, deposited back into the card box supply. In a step 396, the system 10 may advance the tray 60 to the singulator 70. In a step 398, the cards 12 identified from the retrieval list may be shunted out to discharge 18, and removed from database 44B. In a step 404 the system 10 may check whether additional storage boxes are needed (housing 140). If no, card processing may be finalized in step 208. If yes, the system 10 may restart step 386 with another box housing. All other cards 12 may be re-processed and re-stored in the storage 20, with card locations updated in the database 44B to enable future retrieval of stored and re-processed cards. In a step 208, the system 10 may finalize card processing results as before.

Figures 41, 42:
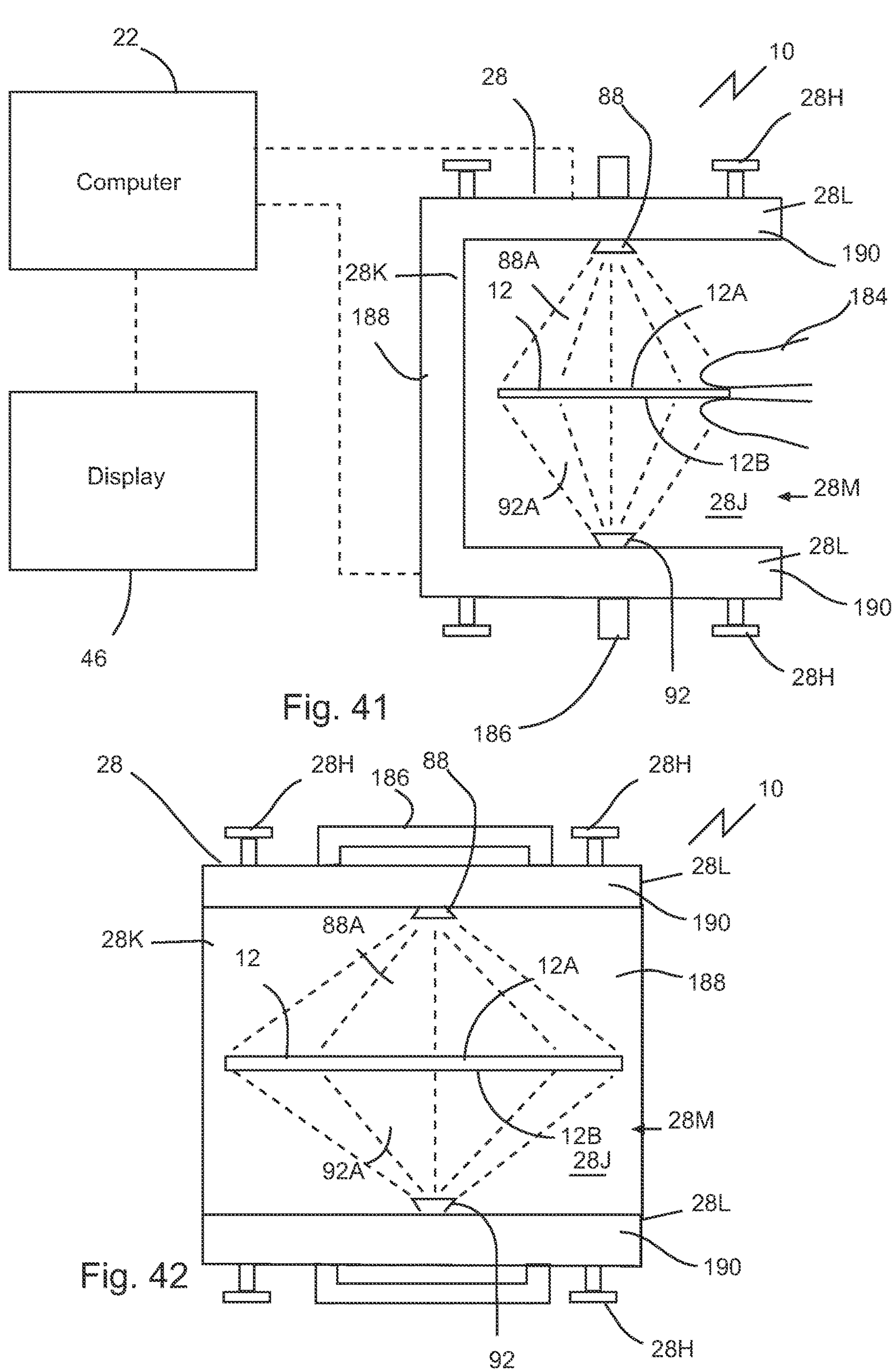
FIG. 41 is a side elevation and schematic view of a hand-held trading card management system, with connections to computing equipment shown in dashed lines, and with a user's hand shown holding a trading card in a field of view of two opposing cameras.
FIG. 42 is a front-end view of the system of FIG. 41.

Referring to FIGS. 41 and 42, a trading card identification system 10 is illustrated. The system 10 shown is an example of a compact system that may carry out the card identifying functions of the systems 10 described elsewhere in this document, without any storage or feed properties (although such may be present in some embodiments). The system 10 may comprise a structural frame 28. The frame 28 may be formed by suitable frame members, such as a stem 28K and arms 28L. The stem 28K and arms 28L may form a C-shaped portion of the frame 28. The frame 28 may be formed by columns and beams in some cases. The frame 28 may have one or more ground-engaging feet 28H, for example threaded into the frame 28 for height adjustability and levelling. One or more faces or sides of the frame 28 may incorporate handles 186, which may be used by a user to reposition the system 10. The provision of handles 186 on various parts of the frame 28 may allow the frame 28 to be oriented in various orientations upon a base surface such as a counter. The system 10 may comprise a card identifier having a camera 88 that is mounted on a structural frame 28 and directed to capture images of a face 12A of a trading card 12 received in use in a card imaging area defined by the structural frame 28. The frame 28 may define a card insertion bay 28J, which may function as both a card receiver 14 and card identifier 16. The card imaging area may be within the card insertion bay that opens to an exterior of the trading card identification system 10. A bay 28J may define a one-way entry and exit for a single card 12 at a time by hand. The frame 28 may define an open-air structure. The frame 28 may be structured to open the bay 28J to outside light. In some cases, the systems 10 herein may use ambient light to illuminate the imaging area, without any flash use or dedicated built-in lighting to assist in imaging. In some cases, one or more flashes or lights may be provided to operate in conjunction with the camera(s). The bay 28J may be characterized by having an open mouth 28M. The mouth 28M may be sized to receive into the card imaging area a part of a human hand and a trading card held by the human hand. The computer 22 may be structured to analyze images of the trading card 12 and distinguish between trading card identity characteristics and human and non-trading card identity characteristics, such as fingers that would appear in the field of view of both cameras 88 and 92. The mouth 28M may be sized to receive a hand or part of a hand of a user, for example fingers 184 as shown in FIG. 41, to allow a user to manually position a trading card 12 within the field of view 88A of a camera 88, and in some cases, also within the field of view 92A of a second camera 92. The card identifier may comprise a camera 88, and in some cases a camera 92, with both cameras mounted on the structural frame 28. The cameras 88 and 92 may be directed to capture images of opposed faces 12A and 12B of a trading card 12 received in the card receiver bay 28J.

Referring to FIGS. 41-42, one or more computers may be connected to receive the images and identify the trading card 12, for example via data cables shown in dashed lines. The computer 22 may output the identification to a display 46, and/or may output the data to a storage medium as above. The computer 22 may be structured to analyze images of an individual trading card 12 imaged by the card identifier. The computer 22 may be structured to distinguish in the images between trading card identity characteristics, such as edges, titles, and other features as above, and human and non-trading card identity characteristics, such as the finger 184 of the user as shown in FIG. 41. The computer 22 may be structured to identify and store in a card storage inventory database one or more identity characteristics of individual trading cards identified at the card identifier. The images may be taken simultaneously, to allow the computer 22 to identify the front and rear faces 12A and 12B of the card 12, to verify what type of card it is, and the computer 22 may thereafter classify the card 12 by the characteristics of the front face 12A. The system 10 may be used in a suitable context, such as adjacent a point-of-sale terminal in a store, to provide users with efficient and convenient identification and pricing information on individual cards 12. The system 10 may relay such data as above to an off-site or other remote computer 50, for example which may be connected via the internet 48 to store data about the cards 12 processed with the system 10. In this way, the system 10 may be used in some cases to collect information on cards 12 before they are transferred by or to the store operator, and in some cases even when such cards 12 are not transferred (for example if a customer is merely identifying cards or is deciding whether to buy or sell such cards). The data collected by such unit may be useful to derive trends and information on cards that are moving at a particular location, regardless of whether sales are actually occurring for such cards. The computer may thus comprise a plurality of local computers 22 and a remote computer 50. Each local computer 22 may be adjacent to the card identifier and connected to receive the images. For example, a local computer may be considered local if it is within the same building or room or store that contains the card identifier. The remote computer 50 may be connected to the local computer(s) 22 via the internet to receive images or identity characteristics from the local computer 22. There may be a plurality of pairs of card identifiers and local computers, at different geographical locations, for example at different stores or events through a city, state, province, or country. The remote computer may be connected to each of the local computers via the internet to receive and store images or identity characteristics from the local computers. In this way, data may be obtained on card use from a plurality of stores and events geographically distinct from one another, for example miles, tens of miles, hundreds of miles, or thousands of miles, apart from one another. In some cases, the data may be obtained in real-time. In some cases, the data may be obtained whenever an actual or potential card transfer occurs at a given location.

Referring to FIG. 1, in some cases, data from cards 12 processed in the system 10 may be stored or transferred to a computer or computers 50 off-site. For example, the operator or manufacturer or other third party may operate a host server or computer 50, for example accessible by the internet 48, with a remote data connection to the computer 22 that is on site. The computer 22 (which may have a power supply 52) may be programmed (structured) to transmit data, for example lists of cards, including card identities, quantities, qualities (condition), values, and other criteria, of cards 12 processed in the system 10. The data may be processed by the computer 50, for example by a processor 56 of the computer 50, and may be stored in a computer readable storage medium 54 of the computer 56, and/or displayed on a display 58 of the computer 50. The data may be arranged and catalogued in a database and used for other purposes, such as to monitor trends in the industry, or for sale to manufacturers of game cards or stores. Data on cards processed by the machine may be valuable, even if the data is of cards processed, rather than simply bought, because the data may reflect which cards are moving or popular on site or in particular regions, even when such cards are not actually being transferred between owners. The data may also be compared with types of stores, including stores in certain geographical areas, and stores that host certain events, in order to track demand for specific cards at those sites.

In some cases, the embodiments herein do not invest energy in physically sorting and storing trading cards—instead, the cards may be stored as they are received, with storage locations associated with each card in information stored in inventory for later retrieval. Various steps may be omitted from each flow chart process, and from other processes described herein. At any point in each process, information may be conveyed to a user for display. Although a user interface 47 is described, any generic display and interface may be used, including a screen with keyboard or mouse, a custom button pad, a touch screen, and others. All actuators may have suitable parts and configurations, such as motors, magnets and others. The systems 10 are described above with respect to the game Magic: The Gathering™ but may be used on any card game set. Every step carried out by a computer may be carried out by one or more computers. In some cases, trading cards 12 may be fed into a singulator without being upright and/or without being oriented on edge, for example, the cards 12 may be fed into the singulator while resting on face (face down). In some cases, a computer-readable storage medium may be provided storing data sufficient to operate the systems and methods disclosed herein if connected to the computer of the system.

In some cases, certain cards 12 that are identified may be selected for processing other than storage in a card box 120 or card storage 20. For example, while processing a stack of cards, the system 10 may be looking for certain cards that the user wants to locate but not store, and such cards may be passed directly into discharge instead of into a card box.

In the claims, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

The embodiments of the invention in which an exclusive property or privilege is claimed are defended as follows:

1. A trading card identification system comprising:

a card identifier having a camera that is mounted on a structural frame and directed to capture images of a face of a trading card received in use within a card imaging area defined by the structural frame, the card identifier configured to output cards to a staging area;

a computer connected to receive the images and identify one or more identity characteristics of the trading card from the images; and a card translocator structured to move trading cards from the staging area into and out of a card storage based on commands from the computer, in which the card translocator comprises a crane with a multi-axis gantry and a card gripper.

2. The trading card identification system of claim 1 in which the card imaging area is within a card insertion bay that opens to an exterior of the trading card identification system.

3. The trading card identification system of claim 2 in which:

a mouth of the card insertion bay is sized to receive into the card imaging area a part of a human hand and a trading card held by the human hand; and the computer is structured to analyze images of the trading card and distinguish between trading card identity characteristics and human and non-trading card identity characteristics.

4. The trading card identification system of claim 1 in which the computer comprises:

a local computer adjacent to the card identifier and connected to receive the images; and a remote computer connected to the local computer via the internet to receive images or identity characteristics from the local computer.

5. The trading card identification system of claim 4 in which there are a plurality of pairs of card identifiers and local computers, at different geographical locations, and the remote computer is connected to each of the local computers via the internet to receive and store images or identity characteristics from the local computers.

6. The trading card identification system of claim 1 further comprising a card receiver that has a card stack tray and a card singulator, which is structured to advance one trading card at a time from the card stack tray into the card identifier.

7. The trading card identification system of claim 6 in which:

the card stack tray is structured to hold a stack of trading cards with each trading card in an upright position, on edge, with the stack of trading cards resting upon a rear shoulder of the card stack tray distal the card singulator; and the card stack tray is structured to translate the stack of trading cards relative to and into contact with the card singulator along a card advancement axis defined by the card stack tray.

8. The trading card identification system of claim 6 in which the card receiver is structured to skew the stack of trading cards relative to the card advancement axis defined by the card stack tray.

9. The trading card identification system of claim 8 in which:

the card singulator comprises:

a vertical roller disposed in an advancement path of trading cards in the card stack tray; and a lateral guide wall spaced adjacent the vertical roller to define a card slot; and the card receiver is structured to orient the stack of trading cards within the card stack tray to direct, for one trading card at a time:

a leading face of the trading card against the card singulator; and a leading edge of the trading card toward the card slot.

10. The trading card identification system of claim 1 in which the card identifier has a chute that is structured to feed trading cards, one at a time from a card receiver, to the card imaging area.

11. The trading card identification system of claim 10 in which the chute is structured to define a card path that twists the trading card along the card path:

from an upright position at a card input end of the chute;

to a face-up position at the card imaging area.

12. The trading card identification system of claim 10 in which the card identifier comprises a card stopper oriented to selectively block and unblock the card path adjacent the card imaging area.

13. The trading card identification system of claim 10 in which the chute is structured to feed trading cards to a card guide that acts as the staging area and is connected to selectively move between:

a card-receiving position where the card guide directs the trading card into a card catcher or the card storage; and a card-discharging position where the card guide directs the trading card to a card discharge.

14. The trading card identification system of claim 13 in which the card guide forms a chute that directs the trading card by gravity to the card discharge when in the card-discharging position.

15. The trading card identification system of claim 13 in which the card catcher is structured to hold a card stack box, whose open end is oriented to receive trading cards from the chute when the card guide is in the card-receiving position.

16. The trading card identification system of claim 15 further comprising a card stack box supply that is structured to:

retain a plurality of empty card stack boxes; and supply the card stack boxes one at a time into the card catcher.

17. The trading card identification system of claim 1 in which the computer is structured to send control signals to direct the card translocator to move trading cards, or card boxes containing trading cards, from the card storage to the card identifier.

18. The trading card identification system of claim 1 in which the card storage is structured to store plural trading cards in card boxes within the card storage.

19. The trading card identification system of claim 1 in which the computer is structured to identify and store in a data storage device the images or one or more identity characteristics of trading cards identified by the computer using images of the trading cards from the card identifier.

20. A method comprising:

imaging a face of an individual trading card, which is received within a card imaging area defined by a structural frame, using a camera mounted to the structural frame and directed to the card imaging area;

using a processor to analyze the images and identify the individual trading card;

outputting the individual trading card to a staging area; and using a card translocator to move trading cards from the staging area into and out of a card storage based on commands from the processor, in which the card translocator comprises a crane with a multi-axis gantry and a card gripper.

* * * * *